United States Patent
Sarkis et al.

(10) Patent No.: US 11,882,477 B2
(45) Date of Patent: Jan. 23, 2024

(54) SIDELINK CONFLICT INDICATION

(71) Applicant: QUALCOMM Incorporated, San Diego, CA (US)

(72) Inventors: Gabi Sarkis, San Diego, CA (US); Tien Viet Nguyen, Bridgewater, NJ (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/149,628

(22) Filed: Jan. 14, 2021

(65) Prior Publication Data
US 2022/0225160 A1 Jul. 14, 2022

(51) Int. Cl.
- *H04W 28/02* (2009.01)
- *H04W 28/26* (2009.01)
- *H04W 72/02* (2009.01)
- *H04W 72/30* (2023.01)

(52) U.S. Cl.
CPC ... *H04W 28/0284* (2013.01); *H04W 28/0289* (2013.01); *H04W 28/26* (2013.01); *H04W 72/02* (2013.01); *H04W 72/30* (2023.01)

(58) Field of Classification Search
None
See application file for complete search history.

(56) References Cited

U.S. PATENT DOCUMENTS

| | | | |
|---|---|---|---|
| 2019/0319723 A1 | 10/2019 | Axmon et al. | |
| 2021/0219320 A1* | 7/2021 | Belleschi | H04W 76/14 |
| 2022/0046628 A1 | 2/2022 | Ji et al. | |

FOREIGN PATENT DOCUMENTS

| | | |
|---|---|---|
| WO | WO-2020011336 A1 | 1/2020 |
| WO | WO-2020173536 A1 | 9/2020 |
| WO | WO-2020200603 A1 | 10/2020 |
| WO | WO-2020220290 A1 | 11/2020 |

OTHER PUBLICATIONS

Partial International Search Report—PCT/US2022/011553—ISA/EPO—dated May 6, 2022.
International Search Report and Written Opinion—PCT/US2022/011553—ISA/EPO—dated Jul. 28, 2022.

* cited by examiner

*Primary Examiner* — Alex Skripnikov
(74) *Attorney, Agent, or Firm* — Holland & Hart LLP

(57) ABSTRACT

Methods, systems, and devices for wireless communications are described. A first user equipment (UE) may identify a conflict between sidelink messages in one or more sidelink resources of a set of sidelink resources reserved for communications by a second UE. In response to identifying the conflict, the first UE may measure a system load of a sidelink channel for the sidelink messages and may determine a threshold system load of the sidelink channel based on one or more priorities associated with the conflicting sidelink messages. If the system load satisfies the threshold system load, the first UE may transmit a message that indicates the conflict. Additionally, or alternatively, the first UE may transmit the conflict indication using a resource determined based on whether one or more of the conflicting sidelink messages are a broadcast sidelink message or a groupcast sidelink message.

30 Claims, 19 Drawing Sheets

… (1)

SIDELINK CONFLICT INDICATION

FIELD OF TECHNOLOGY

The following relates to wireless communications, including sidelink conflict indication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems support sidelink communications between UEs. In some examples, sidelink communications between UEs may be reservation-based, such that the resources used for messages may be scheduled by a network entity, or the resources may be autonomously reserved (e.g., used for sidelink messages) by the UEs. In some cases, one or more sidelink resources associated with a first sidelink message or sidelink reservation may conflict with (e.g., overlap with) one or more sidelink resources associated with a second sidelink message or sidelink reservation. Such conflicts may reduce reliability and increase noise associated with sidelink message transmission.

SUMMARY

The described techniques relate to improved methods, systems, devices, and apparatuses that support sidelink conflict indication. Generally, the described techniques provide for considering system load when transmitting sidelink conflict indications and for transmitting sidelink conflict indications according to cast type. For example, first UE may identify a conflict between sidelink messages (e.g., sidelink transmissions) in one or more sidelink resources of a set of sidelink resources reserved for communications by a second UE. In some examples, a conflict between sidelink messages may refer to an overlap in time, frequency, or both, of sidelink resources associated with (e.g., reserved for, used for transmission of, or a combination thereof) the conflicting sidelink messages. In response to identifying the conflict, the first UE may measure a system load of a sidelink channel for the sidelink messages. The first UE may determine a threshold system load of the sidelink channel (e.g., based on one or more priorities associated with the conflicting sidelink messages such as a highest priority of the conflicting sidelink messages) and may compare the measured system load to the threshold system load. If the measured system load satisfies (e.g., is less than, is less than or equal to) the threshold system load, the first UE may transmit, to the second UE or one or more other UEs, a conflict indication that indicates the conflict between sidelink messages. Alternatively, if the measured system load fails to satisfy (e.g., is greater than, is greater than or equal to) the threshold system load, the first UE may refrain from transmitting the conflict indication.

In some examples, the second UE may receive the conflict indication. In response to receiving the conflict indication, the second UE may measure the system load and may determine a second threshold system load corresponding to a priority of a sidelink message of the conflicting messages that is associated with (e.g., to be transmitted by, previously transmitted by) the second UE. The second UE may compare the measured system load to the second threshold system load to determine whether the measured system load satisfies the second threshold system load. If the measured system load satisfies the second threshold system load, the second UE may transmit (e.g., retransmit) the sidelink message. If the measured system load fails to satisfy the second threshold system load, the second UE may refrain from transmitting the sidelink message.

Additionally, or alternatively, the first UE may transmit the conflict indication based on one or more cast types associated with the conflicting sidelink messages. For example, to facilitate conflict indication transmission for sidelink messages having no associated sidelink feedback resource (e.g., broadcast sidelink messages), the first UE may determine a resource for transmission of the conflict indication by using a feedback mapping rule associated with determining feedback resources for unicast sidelink messages or groupcast sidelink messages. Additionally, or alternatively, to facilitate conflict indication transmission for a sidelink message having multiple associated sidelink feedback resources (e.g., a groupcast-Option 2 sidelink messages), the first UE may determine the resource for transmission of the conflict indication based on a group size of a group associated with the sidelink message or using the feedback mapping rules associated with determining feedback resources for unicast sidelink messages or groupcast sidelink messages. The first UE may transmit the conflict indication using the determined resource.

A method for wireless communication at a first UE is described. The method may include identifying a conflict between sidelink transmissions in one or more sidelink resources of a set of sidelink resources reserved for communications by a second UE, measuring a system load of a sidelink channel for the sidelink transmissions based on identifying the conflict, and transmitting a message including an indication of the conflict based on the system load satisfying a threshold system load of the sidelink channel.

An apparatus for wireless communication at a first UE is described. The apparatus may include a processor, memory in electronic communication with the processor, and instructions stored in the memory. The instructions may be executable by the processor to cause the apparatus to identify a conflict between sidelink transmissions in one or more sidelink resources of a set of sidelink resources reserved for communications by a second UE, measure a system load of a sidelink channel for the sidelink transmissions based on identifying the conflict, and transmit a message including an indication of the conflict based on the system load satisfying a threshold system load of the sidelink channel.

Another apparatus for wireless communication at a first UE is described. The apparatus may include means for identifying a conflict between sidelink transmissions in one or more sidelink resources of a set of sidelink resources reserved for communications by a second UE, means for measuring a system load of a sidelink channel for the sidelink transmissions based on identifying the conflict, and means for transmitting a message including an indication of the conflict based on the system load satisfying a threshold system load of the sidelink channel.

A non-transitory computer-readable medium storing code for wireless communication at a first UE is described. The code may include instructions executable by a processor to identify a conflict between sidelink transmissions in one or more sidelink resources of a set of sidelink resources reserved for communications by a second UE, measure a system load of a sidelink channel for the sidelink transmissions based on identifying the conflict, and transmit a message including an indication of the conflict based on the system load satisfying a threshold system load of the sidelink channel.

Some examples of the method, apparatuses, and non-transitory computer-readable medium described herein may further include operations, features, means, or instructions for determining the threshold system load of the sidelink channel based on one or more priorities associated with the sidelink transmissions.

Some examples of the method, apparatuses, and non-transitory computer-readable medium described herein may further include operations, features, means, or instructions for determining a priority of a sidelink transmission of the sidelink transmissions, where the sidelink transmission may be associated with a highest priority of the sidelink transmissions and selecting the threshold system load from a set of threshold system loads based on the priority of the sidelink transmission that may be associated with the highest priority.

In some examples of the method, apparatuses, and non-transitory computer-readable medium described herein, the set of threshold system loads may be configured or pre-configured for the first UE, and each of the set of threshold system loads corresponds to a respective priority of a set of priorities for sidelink communications.

Some examples of the method, apparatuses, and non-transitory computer-readable medium described herein may further include operations, features, means, or instructions for identifying a second conflict between second sidelink transmissions in one or more sidelink resources of a second set of sidelink resources reserved for communications by the second UE, measuring a second system load of the sidelink channel for the second sidelink transmissions based on identifying the second conflict, and refraining from transmitting a second message including an indication of the second conflict based on the second system load failing to satisfy a second threshold system load of the sidelink channel, the second threshold system load based on one or more priorities associated with the second sidelink transmissions.

In some examples of the method, apparatuses, and non-transitory computer-readable medium described herein, measuring the system load of the sidelink channel may include operations, features, means, or instructions for measuring a channel occupancy ratio (CR) associated with the sidelink channel, a channel busy ratio (CBR) associated with the sidelink channel, or both.

In some examples of the method, apparatuses, and non-transitory computer-readable medium described herein, the conflict between sidelink transmissions includes a time overlap of the one or more sidelink resources, a frequency overlap of the one or more sidelink resources, or both.

In some examples of the method, apparatuses, and non-transitory computer-readable medium described herein, transmitting the message including the indication of the conflict may include operations, features, means, or instructions for transmitting the message including the indication of the conflict after the conflict may have occurred, where the indication of the conflict indicates retransmission of a sidelink transmission by the second UE.

In some examples of the method, apparatuses, and non-transitory computer-readable medium described herein, transmitting the message including the indication of the conflict may include operations, features, means, or instructions for transmitting the message including the indication of the conflict prior to the conflict occurring, where the indication of the conflict indicates the second UE to refrain from transmitting a sidelink transmission.

A method for wireless communication at a first UE is described. The method may include decoding sidelink control information (SCI) from a second UE that indicates a set of sidelink resources reserved for communications by the second UE, the SCI associated with a broadcast sidelink message or a groupcast sidelink message, identifying, based on the SCI, a conflict between sidelink messages in one or more sidelink resources of the set of sidelink resources, determining a resource of a sidelink feedback channel for transmission of an indication of the conflict based on whether the SCI is associated with the broadcast sidelink message or the groupcast sidelink message, and transmitting a message including the indication of the conflict using the sidelink feedback channel and the determined resource.

An apparatus for wireless communication at a first UE is described. The apparatus may include a processor, memory in electronic communication with the processor, and instructions stored in the memory. The instructions may be executable by the processor to cause the apparatus to decode SCI from a second UE that indicates a set of sidelink resources reserved for communications by the second UE, the SCI associated with a broadcast sidelink message or a groupcast sidelink message, identify, based on the SCI, a conflict between sidelink messages in one or more sidelink resources of the set of sidelink resources, determine a resource of a sidelink feedback channel for transmission of an indication of the conflict based on whether the SCI is associated with the broadcast sidelink message or the groupcast sidelink message, and transmit a message including the indication of the conflict using the sidelink feedback channel and the determined resource.

Another apparatus for wireless communication at a first UE is described. The apparatus may include means for decoding SCI from a second UE that indicates a set of sidelink resources reserved for communications by the second UE, the SCI associated with a broadcast sidelink message or a groupcast sidelink message, means for identifying, based on the SCI, a conflict between sidelink messages in one or more sidelink resources of the set of sidelink resources, means for determining a resource of a sidelink feedback channel for transmission of an indication of the conflict based on whether the SCI is associated with the broadcast sidelink message or the groupcast sidelink message, and means for transmitting a message including the indication of the conflict using the sidelink feedback channel and the determined resource.

A non-transitory computer-readable medium storing code for wireless communication at a first UE is described. The code may include instructions executable by a processor to decode SCI from a second UE that indicates a set of sidelink resources reserved for communications by the second UE, the SCI associated with a broadcast sidelink message or a groupcast sidelink message, identify, based on the SCI, a conflict between sidelink messages in one or more sidelink resources of the set of sidelink resources, determine a resource of a sidelink feedback channel for transmission of an indication of the conflict based on whether the SCI is associated with the broadcast sidelink message or the groupcast sidelink message, and transmit a message including the indication of the conflict using the sidelink feedback channel and the determined resource.

Some examples of the method, apparatuses, and non-transitory computer-readable medium described herein may further include operations, features, means, or instructions for determining that the SCI may be associated with the broadcast sidelink message, where the resource of the sidelink feedback channel may be determined based on a feedback mapping rule associated with a unicast sidelink message or a second groupcast sidelink message.

Some examples of the method, apparatuses, and non-transitory computer-readable medium described herein may further include operations, features, means, or instructions for determining that the SCI may be associated with the groupcast sidelink message and determining that the second UE may be a member of a group associated with the groupcast sidelink message, where the resource of the sidelink feedback channel may be determined based on a group size of the group associated with the groupcast sidelink message.

Some examples of the method, apparatuses, and non-transitory computer-readable medium described herein may further include operations, features, means, or instructions for determining that the SCI may be associated with the groupcast sidelink message, determining that the second UE may be exclusive of a group associated with the groupcast sidelink message, and applying a feedback mapping rule associated with determining a feedback resource associated with a unicast sidelink message or a groupcast-option1 sidelink message to determine the resource of the sidelink feedback channel.

In some examples of the method, apparatuses, and non-transitory computer-readable medium described herein, the determined resource may be a configured resource for the broadcast sidelink message or the groupcast sidelink message.

In some examples of the method, apparatuses, and non-transitory computer-readable medium described herein, the determined resource may be a pre-configured resource for the broadcast sidelink message or the groupcast sidelink message.

In some examples of the method, apparatuses, and non-transitory computer-readable medium described herein, the conflict between sidelink transmissions includes a time overlap of the one or more sidelink resources, a frequency overlap of the one or more sidelink resources, or both.

In some examples of the method, apparatuses, and non-transitory computer-readable medium described herein, transmitting the message including the indication of the conflict may include operations, features, means, or instructions for transmitting the message including the indication of the conflict after the conflict may have occurred, where the indication of the conflict indicates retransmission of a sidelink transmission by the second UE.

In some examples of the method, apparatuses, and non-transitory computer-readable medium described herein, transmitting the message including the indication of the conflict may include operations, features, means, or instructions for transmitting the message including the indication of the conflict prior to the conflict occurring, where the indication of the conflict indicates the second UE to refrain from transmitting a sidelink transmission.

A method for wireless communication at a first UE is described. The method may include receiving, from a second UE, a message that indicates a conflict between sidelink messages in one or more sidelink resources of a set of sidelink resources reserved for communications by the first UE, measuring a system load of a sidelink channel for the sidelink messages based on receiving the message, and transmitting a sidelink message of the sidelink messages based on the system load satisfying a threshold system load of the sidelink channel, where the threshold system load of the sidelink is based on a priority of the sidelink message, and where the sidelink message is associated with the first UE.

An apparatus for wireless communication at a first UE is described. The apparatus may include a processor, memory in electronic communication with the processor, and instructions stored in the memory. The instructions may be executable by the processor to cause the apparatus to receive, from a second UE, a message that indicates a conflict between sidelink messages in one or more sidelink resources of a set of sidelink resources reserved for communications by the first UE, measure a system load of a sidelink channel for the sidelink messages based on receiving the message, and transmit a sidelink message of the sidelink messages based on the system load satisfying a threshold system load of the sidelink channel, where the threshold system load of the sidelink is based on a priority of the sidelink message, and where the sidelink message is associated with the first UE.

Another apparatus for wireless communication at a first UE is described. The apparatus may include means for receiving, from a second UE, a message that indicates a conflict between sidelink messages in one or more sidelink resources of a set of sidelink resources reserved for communications by the first UE, means for measuring a system load of a sidelink channel for the sidelink messages based on receiving the message, and means for transmitting a sidelink message of the sidelink messages based on the system load satisfying a threshold system load of the sidelink channel, where the threshold system load of the sidelink is based on a priority of the sidelink message, and where the sidelink message is associated with the first UE.

A non-transitory computer-readable medium storing code for wireless communication at a first UE is described. The code may include instructions executable by a processor to receive, from a second UE, a message that indicates a conflict between sidelink messages in one or more sidelink resources of a set of sidelink resources reserved for communications by the first UE, measure a system load of a sidelink channel for the sidelink messages based on receiving the message, and transmit a sidelink message of the sidelink messages based on the system load satisfying a threshold system load of the sidelink channel, where the threshold system load of the sidelink is based on a priority of the sidelink message, and where the sidelink message is associated with the first UE.

Some examples of the method, apparatuses, and non-transitory computer-readable medium described herein may further include operations, features, means, or instructions for selecting the threshold system load from a set of threshold system loads based on the priority of the sidelink message.

In some examples of the method, apparatuses, and non-transitory computer-readable medium described herein, the set of threshold system loads may be configured or preconfigured for the first UE, and each of the set of threshold system loads corresponds to a respective priority of a set of priorities for sidelink communications.

Some examples of the method, apparatuses, and non-transitory computer-readable medium described herein may further include operations, features, means, or instructions for receiving, from the second UE, a second message that indicates a second conflict between second sidelink messages in one or more sidelink resources of a second set of sidelink resources reserved for communications by the first UE, measuring a second system load of the sidelink channel for the second sidelink messages based on receiving the second message, and refraining from transmitting a second sidelink message of the second sidelink messages based on the second system load failing to satisfy a second threshold system load of the sidelink channel, where the second threshold system load is based on a second priority of the second sidelink message, and where the second sidelink message is associated with the first UE.

In some examples of the method, apparatuses, and non-transitory computer-readable medium described herein, measuring the system load of the sidelink channel may include operations, features, means, or instructions for measuring a CR associated with the sidelink channel, a CBR associated with the sidelink channel, or both.

In some examples of the method, apparatuses, and non-transitory computer-readable medium described herein, the conflict between sidelink transmissions includes a time overlap of the one or more sidelink resources, a frequency overlap of the one or more sidelink resources, or both.

In some examples of the method, apparatuses, and non-transitory computer-readable medium described herein, receiving the message that indicates the conflict may include operations, features, means, or instructions for receiving the message that indicates the conflict after the conflict may have occurred, where the message indicates retransmission of the sidelink message by the first UE, and where transmitting the sidelink message may be based on the message indicating retransmission of the sidelink message by the first UE.

In some examples of the method, apparatuses, and non-transitory computer-readable medium described herein, receiving the message that indicates the conflict may include operations, features, means, or instructions for receiving the message that indicates the conflict prior to the conflict occurring, where the message indicates the second UE to refrain from transmitting the sidelink message.

DETAILED DESCRIPTION

Figure 1:
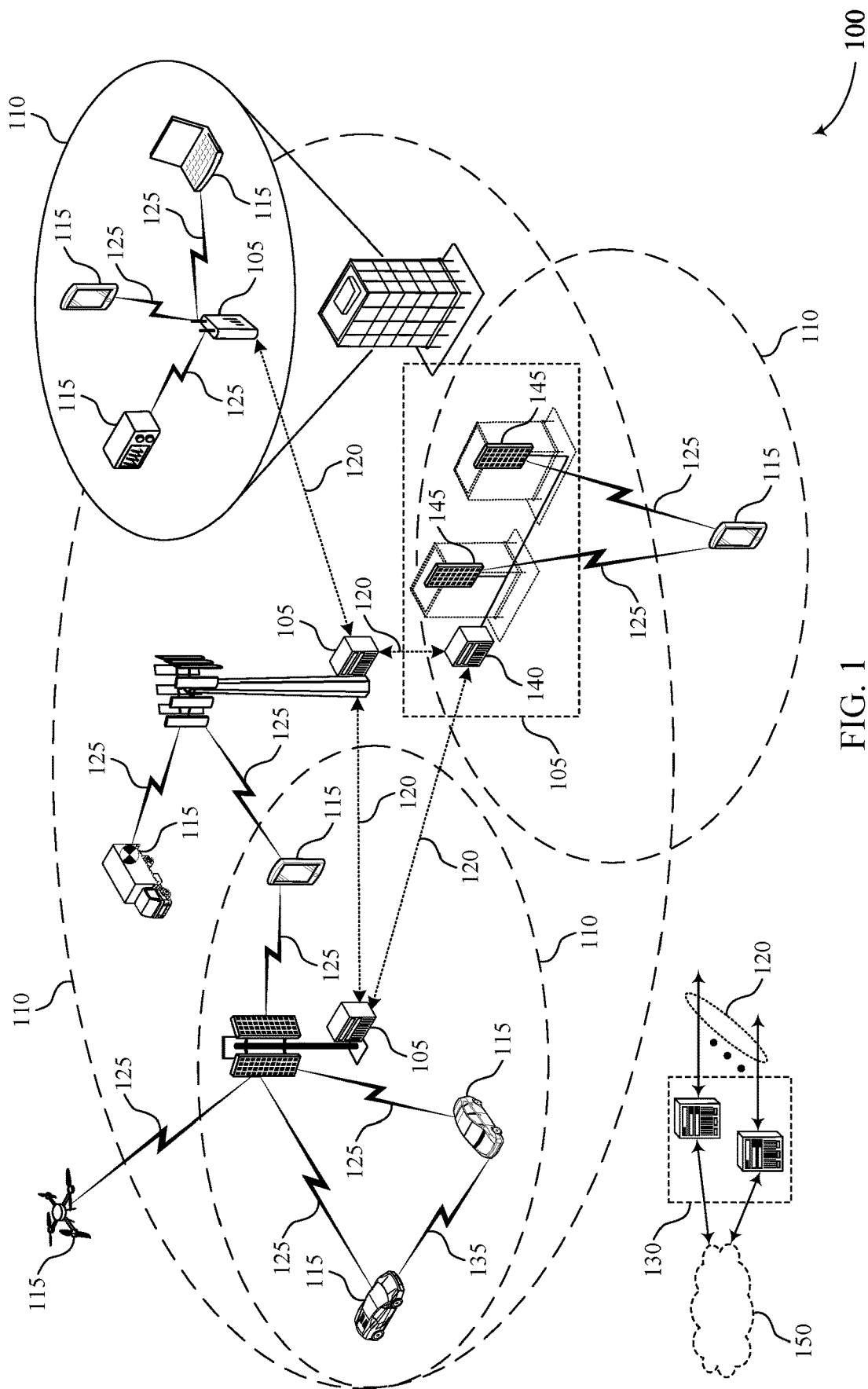
FIGS. 1 and 2 illustrate examples of wireless communications systems that support sidelink conflict indication in accordance with aspects of the present disclosure.

Some wireless communications systems may support sidelinks for communications between communication devices. Sidelinks may refer to any communication link between similar communication devices such as user equipments (UEs). It is noted that while various examples provided herein are discussed for UE sidelink devices, such sidelink techniques may be used for any type of wireless devices that use sidelink communications. For example, a sidelink may support one or more of device-to-device (D2D) communications, vehicle-to-everything (V2X) or vehicle-to-vehicle (V2V) communications, message relaying, discovery signaling, beacon signaling, or other signals transmitted over-the-air from one UE to one or more other UEs.

Sidelink communications between UEs may be reservation-based, such that the resources used for transmissions on a sidelink channel may be scheduled by a network entity, or the resources may be autonomously reserved (e.g., used for sidelink transmissions) by the UEs. In some cases, a UE may receive control signaling such as sidelink control information (SCI) that indicates a set of resources available for reservation from a sidelink resource pool. The set of resources available for reservation also indicates those resources that have already been reserved by other UEs. In some cases, a UE may miss one or more reservations and may attempt to reserve sidelink resources that are already reserved, which may result in conflicting reservations and/or sidelink message transmissions. In some examples, a conflict between sidelink messages may refer to an overlap in time, frequency, or both, of sidelink resources associated with (e.g., reserved for, used for transmission of, or a combination thereof) the conflicting sidelink messages. A different UE may identify the conflict and may transmit an indication of the conflict (e.g., a conflict indication) to one or more of the UEs associated with the conflict. However, in some cases, transmitting the conflict indication may increase channel congestion and system load of the sidelink channel and may cause additional conflicts, for example, if any other sidelink messages are transmitted on a resource used to transmit the conflict indication.

Additionally, in some examples, the conflict indication is transmitted using a feedback resource. However, sidelink messages associated with some cast types (e.g., broadcast sidelink messages, some groupcast sidelink messages) may not have or may have multiple corresponding feedback resources. Accordingly, the UE transmitting the conflict indication may not know which feedback resource to use to transmit the conflict indication.

Techniques, systems, and devices are described herein to transmit sidelink conflict indications based on system load to reduce channel congestion and system load of a sidelink channel and increase reliability of sidelink messages. Techniques, systems, and devices are additionally described herein to facilitate conflict indication transmission for sidelink messages according to cast type.

To transmit sidelink conflict indications based on a system load, a first UE may identify a conflict between sidelink messages (e.g., sidelink transmissions) in one or more sidelink resources of a set of sidelink resources reserved for communications by a second UE. In response to identifying the conflict, the first UE may measure a system load of a sidelink channel for the sidelink messages. The first UE may determine a threshold system load of the sidelink channel (e.g., based on one or more priorities associated with the conflicting sidelink messages such as a highest priority of the conflicting sidelink messages) and may compare the measured system load to the threshold system load. If the measured system load satisfies the threshold system load, the first UE may transmit, to the second UE or one or more other UEs, a conflict indication that indicates the conflict between sidelink messages. Alternatively, if the measured system load fails to satisfy the threshold system load, the first UE may refrain from transmitting the conflict indication.

In some examples, the second UE may receive the conflict indication. In response to receiving the conflict indication, the second UE may measure the system load and may determine a second threshold system load corresponding to a priority of a sidelink message of the conflicting messages that is associated with (e.g., to be transmitted by, previously transmitted by) the second UE. The second UE may compare the measured system load to the second threshold system load to determine whether the measured system load satisfies the second threshold system load. If the measured system load satisfies the second threshold system load, the second UE may transmit (e.g., retransmit) the sidelink message. If the measured system load fails to satisfy the second threshold system load, the second UE may refrain from transmitting the sidelink message.

To transmit sidelink conflict indications for sidelink messages according to cast type, a UE may receive and decode SCI from the UEs causing the conflict. Here, the SCI may be associated with a broadcast sidelink message that has no corresponding feedback resource or a groupcast sidelink message that has multiple corresponding feedback resources (e.g., a groupcast-Option 2 sidelink message). From the combined SCI, the UE may identify that the conflict exists and may transmit a conflict indication to one or more of the UEs causing the conflict using a sidelink feedback resource (e.g., a resource of a sidelink feedback channel). The UE may determine the sidelink feedback resource based on whether the SCI is associated with the broadcast sidelink message or the groupcast sidelink message, as described herein.

Aspects of the subject matter described in this disclosure may be implemented to realize one or more of the following potential improvements, among others. The techniques employed by the UE may provide benefits and enhancements to the operation of the UE. For example, operations performed by the UE may provide improvements to transmitting sidelink conflict indications. In some examples, transmitting sidelink conflict indications based on a system load may reduce channel congestion and system load and increase reliability associated with transmitting sidelink messages. Additionally, in some examples, transmitting sidelink conflict indications according to the techniques described herein may provide improvements to data rates, power consumption, spectral efficiency, and, in some examples, may promote highly reliable communications, among other benefits.

Aspects of the disclosure are initially described in the context of wireless communications systems. Aspects of the disclosure are additionally described in the context of sidelink resource schemes, a resource mapping, and process flows. Aspects of the disclosure are further illustrated by and described with reference to apparatus diagrams, system diagrams, and flowcharts that relate to sidelink conflict indication.

FIG. 1 illustrates an example of a wireless communications system 100 that supports sidelink conflict indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support sidelink communications between UEs 115. Sidelink communications between UEs 115 may be reservation-based, such that the resources used for transmissions on a sidelink channel may be scheduled by a network entity (e.g., a network device of the core network 130, a base station 105), or the resources may be autonomously reserved (e.g., used for sidelink transmissions) by the UEs 115. The wireless communications system 100 may support transmission of conflict indications that indicate conflicts between sidelink messages. For example, in some cases, sidelink resources reserved by two or more UEs 115 may conflict (e.g., overlap) in time, frequency, or both, and a UE 115 may transmit a conflict indication to one or more of the two or more UEs 115 that indicates the overlap. However, in some cases, transmitting the conflict indication may increase channel congestion and system load of the sidelink channel and may cause additional conflicts, for example, if any other sidelink messages are transmitted on a resource used to transmit the conflict indication. Additionally, in some cases, the UE 115 may transmit the conflict indication using a feedback resource of a sidelink channel. However, sidelink messages associated with some cast types (e.g., broadcast sidelink messages, some groupcast sidelink messages) may not have or may have multiple corresponding feedback resources. Accordingly, the UE 115 may not know which feedback resource to use to transmit the conflict indication.

Various aspects of the described techniques support conflict indication transmission based on system load to reduce channel congestion and system load of a sidelink channel and increase reliability of sidelink messages. Additionally, aspects of the described techniques support conflict indication transmission for sidelink messages associated with cast types having no or having multiple corresponding feedback resources.

To transmit sidelink conflict indications based on a system load, the UE 115 may identify the conflict between sidelink messages and, in response, may measure a system load of the sidelink channel associated with the conflicting sidelink messages. The UE 115 may determine a threshold system load of the sidelink channel based on one or more priorities associated with the conflicting sidelink messages. If the measured system load satisfies the threshold system load, the UE 115 may transmit the conflict indication. Alternatively, if the measured system load fails to satisfy the threshold system load, the UE 115 may refrain from transmitting the conflict indication. In some examples, a second UE 115 may receive the conflict indication and may determine whether to transmit (e.g., retransmit) the conflicting sidelink message associated with (e.g., to be transmitted by, previously transmitted by) the second UE based on the system load. For example, the second UE 115 may receive the conflict indication, measure the system load, and determine a second threshold system load based on a priority of the conflicting sidelink message. If the measured system load satisfies the second threshold system load, the second UE 115 may transmit the conflicting sidelink message. Alternatively, if the measured system load fails to satisfy the second threshold system load, the second UE 115 may refrain from transmitting the conflicting sidelink message.

To transmit sidelink conflict indications for sidelink messages associated with cast types having no or having multiple corresponding feedback resources, the UE 115 may receive and decode SCI from the two or more UEs 115 causing the conflict. Here, the SCI may be associated with a broadcast sidelink message that has no corresponding feedback resource or a groupcast sidelink message that has multiple corresponding feedback resources (e.g., a groupcast-Option 2 sidelink message). From the combined SCI, the UE 115 may identify that the conflict exists and may transmit a conflict indication to one or more of the UEs causing the conflict using a sidelink feedback resource (e.g., a resource of a sidelink feedback channel). The UE may determine the sidelink feedback resource based on whether the SCI is associated with the broadcast sidelink message or the groupcast sidelink message, as described herein.

Figure 2:
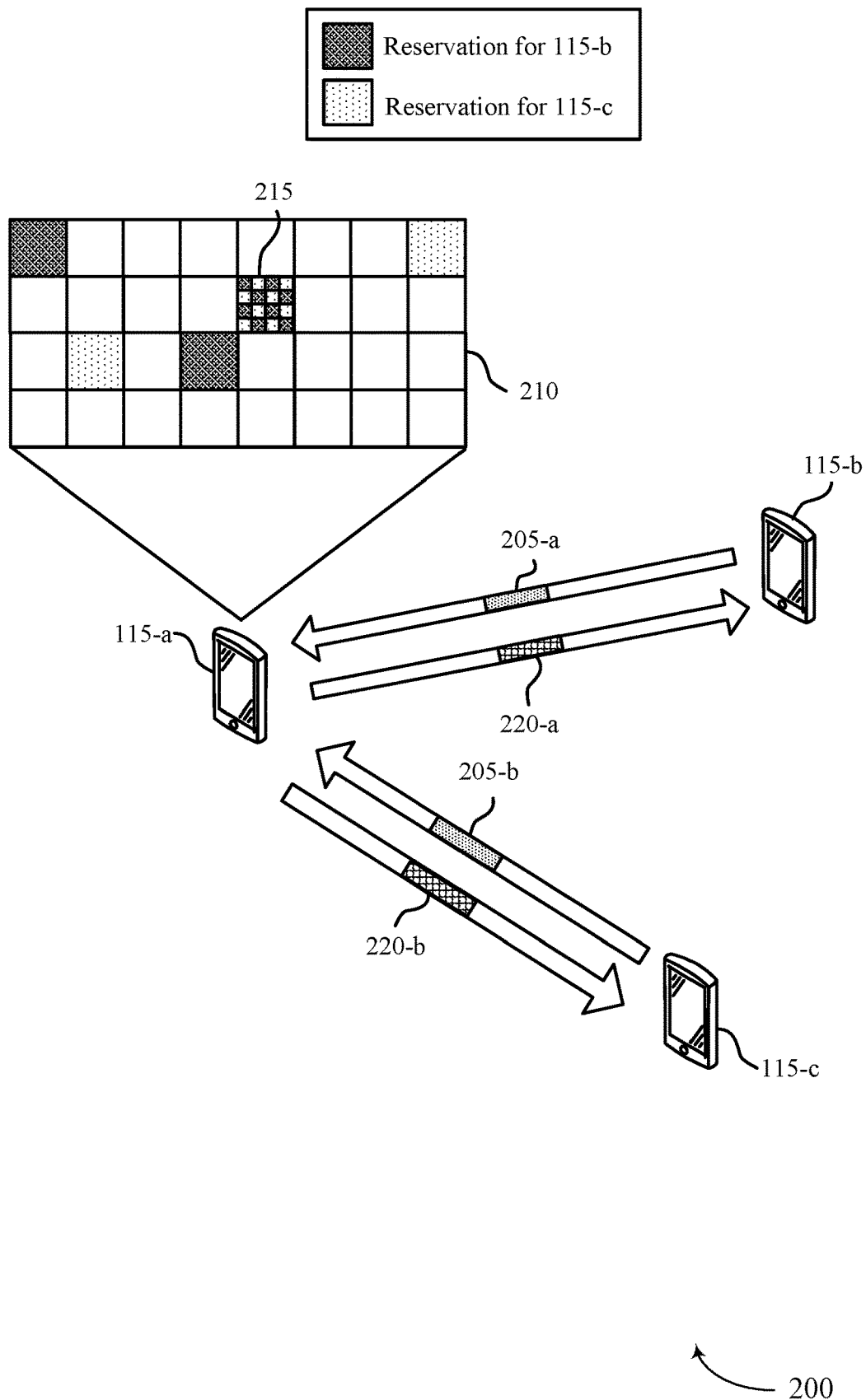

FIG. 2 illustrates an example of a wireless communications system 200 that supports sidelink conflict indication in accordance with aspects of the present disclosure. In some example, the wireless communications system 200 may implement aspects of the wireless communications system 100. For example, the wireless communications system 200 may include a UE 115-a, a UE 115-b, and a UE 115-c, which may be examples of a UE 115 as described with reference to FIG. 1. The wireless communications system 200 may support multiple radio access technologies including 4G systems such as LTE systems, LTE-A systems, or LTE-A Pro systems, and 5G systems, which may be referred to as NR systems, or a combination of these or other radio access technologies. In some examples, the UE 115-a may implement sidelink conflict indication based on system load to reduce channel congestion and system load and increase reliability associated with sidelink message transmission and may implement sidelink conflict indication according to sidelink message cast type. Although the example of wireless communications system 200 illustrates three UEs 115, the techniques described herein may be applicable to any quantity of UEs 115.

In wireless communications system 200, UEs 115 may be configured for sidelink communications via a sidelink interface including one or more logical channels such as a physical sidelink control channel (PSCCH), a physical sidelink discovery channel (PSDCH), a physical sidelink shared channel (PSSCH), a physical sidelink broadcast channel (PSBCH), a physical sidelink feedback channel (PSFCH), or any combination thereof. Sidelink communications between UEs 115 may be reservation based such that the resources may be scheduled by a network entity such as a base station 105 (not shown), or the resources may be autonomously reserved by the UEs 115. In some examples, a UE such as UE 115-a may receive control signaling such as SCI 205 that indicates a set of resources for reservation by other UEs 115-b or 115-c (or both), for example. The UE 115-a may receive SCI 205-a from UE 115-b and may also receive SCI 205-b from UE 115-c. After receiving one or both SCIs 205, the UE 115-a may compile a sidelink resource pool 210. The sidelink resource pool 210 may indicate sidelink resources that may be reserved by other UEs 115-b and 115-c (and possibly additional UEs 115) for sidelink communications (e.g., the sidelink resource pool 210 may be a set of all reservable sidelink resources). The sidelink resources may be in units of sub-channels in the frequency domain and slots in the time domain. Each sub-channel may further contain a number of physical resource blocks (PRBs) for reservation by a UE 115.

In some examples, the wireless communications system 200 may support preemption for sidelink transmissions to reduce latency and increase reliability for high priority sidelink data. For example, in some cases, a UE 115 having a high priority sidelink transmission (e.g., a sidelink transmission with a priority level exceeding a threshold priority)

may preempt a different, lower priority transmission on a same sidelink resource. That is, the UE 115 having the higher priority transmission may reserve the resource even after a UE 115 having the lower priority transmission reserves the sidelink resource, and the higher priority transmission may be transmitted in place of the lower priority transmission.

In some cases, however, one UE 115 may miss (e.g., fail to identify) a reservation from another UE 115 based on a number of factors. For example, one of the UEs 115-b, 115-c may be configured for half-duplex communications, or the network may be configured for intra-UE prioritization. Additionally, or alternatively, one of the UEs 115-b, 115-c may improperly decode SCI due to noise or interference, or due to the presence of multiple SCIs in a same PSCCH, where the UE 115-b, 115-c improperly determines a lower priority transmission from one of the multiple SCIs. In some other cases, the UE 115-b or the UE 115-c may be spatially far from other transmitting UEs 115, and may fail to decode the SCI due to low signal power.

In cases where one of the UEs 115-b, 115-c attempts to reserve or preempt a resource that is reserved by a higher priority transmission, or in cases where one of the UEs 115-b, 115-c misses a previous reservation, a conflict 215 (e.g., a resource overlap in time, or frequency, or both) may occur for transmissions scheduled for the sidelink resource pool 210 (e.g., a time-frequency overlap between the reservations for UE 115-b and UE 115-c may occur). In some other cases, the conflict 215 may be a random conflict (e.g., independent of reservations made for the resource). In some cases, the UE 115-a may be an intended recipient of one or more of the colliding transmissions, or the UE 115-a may identify or observe the conflict 215 for different sidelink UEs (e.g., UEs 115-b and 115-c).

The UE 115-a may identify the conflict 215 and may notify one or more other UEs 115 (e.g., one or more of UE 115-b and UE 115-c) of the conflict 215 by transmitting a conflict indication 220 that indicates the conflict 215. For example, the UE 115-a may transmit a conflict indication 220-a to the UE 115-b, or may transmit a conflict indication 220-b to the UE 115-c, or both. In some examples, a conflict indication 220 may prompt retransmission of a sidelink message transmitted by a respective UE 115 (e.g., UE 115-b, UE 115-c). In some other examples, the conflict indication 220 may preempt transmission of a sidelink message associated with the conflict 215. For example, the UE 115-a may transmit the conflict indication 220-b to preempt transmission of a sidelink message by UE 115-c that uses the sidelink resource associated with the conflict 215.

To reduce channel congestion and system load of a sidelink channel associated with the sidelink resource pool 210, the UE 115-a may transmit the conflict indication 220 based on a measured system load of the sidelink channel. For example, the UE 115-a may identify the conflict 215 and may measure a system load of the sidelink channel in response to identifying the conflict 215. In some examples, the UE 115-a may measure the system load by measuring a channel busy ratio (CBR) of the sidelink channel, a channel occupancy ratio (CR) of the sidelink channel, or a combination thereof, among other measurements used to measure a system load. The UE 115-a may determine a threshold system load of the sidelink channel and may compare the measured system load to the threshold system load. In some examples, the threshold system load may be a threshold CBR, a threshold CR, or a combination thereof. If the measured system load satisfies (e.g., is less than, is less than or equal to) the threshold system load, the UE 115-a may transmit the conflict indication 220-a, or the conflict indication 220-b, or both. Alternatively, if the measured system load fails to satisfy (e.g., is greater than, is greater than or equal to) the threshold system load, the UE 115-a may refrain from transmitting the conflict indication 220-a and the conflict indication 220-b.

In some examples, the measured system load being greater than (or equal to) the threshold system load may indicate that the system (e.g., the sidelink channel) is relatively heavily loaded. That is, a relatively high percentage of sidelink resources of the sidelink resource pool 210 are reserved for transmission of sidelink messages. Therefore, by refraining from transmitting conflict indications 220 when the system is relatively heavily loaded, the UE 115-a may reduce channel congestion and system load.

The UE 115-a may determine the threshold system load based on one or more priorities of the conflicting sidelink messages that are associated with the conflict 215. For example, the UE 115-b may reserve the sidelink resource associated with the conflict 215 for transmission of a first sidelink message that has a first priority, and the UE 115-c may reserve the sidelink resource associated with the conflict 215 for transmission of a second sidelink message that has a second priority. The UE 115-a may determine the higher priority between the first priority and the second priority and may select a threshold system load that corresponds to the higher priority. For example, the UE 115-a may select the threshold system load from a set of threshold system loads, where each threshold system load of the set corresponds to a respective priority of a sidelink message. Accordingly, the UE 115-a may select the threshold system load from the set that corresponds to the higher priority. In this way, determining whether to transmit a conflict indication 220 may be based on priorities of sidelink messages associated with a respective conflict 215. In some examples, a higher priority transmission may correspond to a smaller threshold system load. In some examples, the set of threshold system loads is a configured (e.g., dynamically configured) set of threshold system loads for the UE 115-a. In some other examples, the set of threshold system loads is a pre-configured set of threshold system loads for the UE 115-a (e.g., established during an RRC procedure of the UE 115-a).

The UE 115-a may repeat this procedure for determining whether to transmit a conflict indication 220 for any number of identified conflicts 215. For example, the UE 115-a may identify a second conflict 215 (not shown) and may measure a second system load (e.g., a system load at the time of identifying the second conflict) in response to identifying the second conflict 215. The UE 115-a may determine a second threshold system load based on one or more priorities of sidelink messages associated with the second conflict 215 and may compare the second system load to the second threshold system load. Based on the comparison, the UE 115-a may either transmit or refrain from transmitting one or more corresponding conflict indications 220.

A UE 115 may receive a conflict indication 220 and may determine whether to transmit an associated sidelink message based on a system load of the sidelink channel associated with the sidelink resource pool 210. For example, the UE 115-b may reserve the sidelink resource associated with the conflict 215 for transmission of a first sidelink message. The UE 115-b may receive the conflict indication 220-a indicating that the first sidelink message conflicts with one or more other sidelink messages and may measure a system load of the sidelink channel in response to receiving the conflict indication 220-a. In some examples, the UE 115-b may measure the system load by measuring a CBR of the sidelink channel, a CR of the sidelink channel, or a combination thereof, among other measurements used to measure a system load. The UE 115-*b* may determine a threshold system load (e.g., a threshold CBR, a threshold CR, or a combination thereof) of the sidelink channel and may compare the measured system load to the threshold system load. If the measured system load satisfies (e.g., is less than, is less than or equal to) the threshold system load, the UE 115-*b* may transmit the first sidelink message (e.g., despite the conflict indication 220-*a* preempting transmission of the first sidelink message). Alternatively, if the measured system load fails to satisfy (e.g., is greater than, is greater than or equal to) the threshold system load, the UE 115-*b* may refrain from transmitting the first sidelink message.

The UE 115-*b* may determine the threshold system load based on a priority of the first sidelink message. For example, the UE 115-*b* may determine the priority of the first sidelink message and may select a threshold system load that corresponds to the priority. In some examples, the UE 115-*b* may select the threshold system load from a set of threshold system loads, where each threshold system load of the set corresponds to a respective priority of a sidelink message. Accordingly, the UE 115-*b* may select the threshold system load from the set that corresponds to the priority of the first sidelink message. In some examples, the set of threshold system loads is a configured (e.g., dynamically configured by a base station 105) set of threshold system loads for the UE 115-*b*. In some other examples, the set of threshold system loads is a pre-configured set of threshold system loads for the UE 115-*b* (e.g., established during an RRC procedure of the UE 115-*b*).

The UE 115-*b* may repeat this procedure for determining whether to transmit a sidelink message for any number of received conflict indications 220. For example, the UE 115-*b* may receive a second conflict indication 220 and may measure a second system load (e.g., a system load at the time of receiving the second conflict indication 220) in response to receiving the second conflict indication 220. The UE 115-*b* may determine a second threshold system load based on a priority of a second sidelink message associated with the second conflict indication 220 and may compare the second system load to the second threshold system load. Based on the comparison, the UE 115-*a* may either transmit or refrain from transmitting the second sidelink message.

In some examples, the UE 115-*a* may transmit a conflict indication 220 using a feedback resource of a sidelink feedback channel (e.g., a PSFCH). The UE 115-*a* may determine the feedback resource based on a cast type of the conflicting sidelink messages associated with the conflict 215. For example, in some cases, the SCI 205-*a*, or the SCI 205-*b*, or both, may reserve sidelink resource for transmission of a broadcast sidelink message or a groupcast sidelink message. However, a broadcast sidelink message may not be associated with a corresponding feedback resource. Additionally, some groupcast sidelink messages may be associated with multiple corresponding feedback resources. For example, a groupcast-Option 2 sidelink message may have multiple feedback resources that correspond to respective UEs 115 of a group of UEs 115 that are associated with the groupcast-Option2 sidelink message.

To determine the feedback resource for a conflict indication 220 that is associated with (e.g., transmitted in response to receiving SCI 205 for) a broadcast sidelink message, the UE 115-*a* may use a feedback mapping rule that is associated with determining feedback resources for other cast types. For example, the UE 115-*a* may apply a feedback mapping rule used to determine a feedback resource for a unicast sidelink message to determine the feedback resource. Alternatively, the UE 115-*a* may apply a feedback mapping rule used to determine a feedback resource for a groupcast sidelink message that has one feedback resource (e.g., a groupcast-Option1 sidelink message) to determine the feedback resource.

In some examples, to determine the feedback resource for a conflict indication 220 that is associated with (e.g., transmitted in response to receiving SCI 205 for) a groupcast sidelink message having multiple feedback resources, the UE 115-*a* may use a feedback mapping rule that is associated with determining feedback resources for other cast types. For example, the UE 115-*a* may apply a feedback mapping rule used to determine a feedback resource for a unicast sidelink message to determine the feedback resource. Alternatively, the UE 115-*a* may apply a feedback mapping rule used to determine a feedback resource for a groupcast sidelink message that has one feedback resource (e.g., a groupcast-Option1 sidelink message) to determine the feedback resource. In some examples, the UE 115-*a* may apply one of these feedback mapping rules to determine the feedback resource if the UE 115-*a* is exclusive to (e.g., not a member of) a group associated with groupcast sidelink message.

In some other examples, the UE 115-*a* may determine the feedback resource for a conflict indication 220 that is associated with (e.g., transmitted in response to receiving SCI 205 for) a groupcast sidelink message having multiple feedback resources based on a group size of a group associated with the groupcast sidelink message. For example, the UE 115-*a* may use the group size in a feedback mapping rule used to determine a feedback resource for a groupcast-Option 2 sidelink message to determine the feedback resource. By using the group size, the UE 115-*a* may determine a resource that is unused by any UE 115 that is a member of the group. In some examples, the UE 115-*a* may use the group size to determine the feedback resource if the UE 115-*a* is a member of the group associated with the groupcast sidelink message.

In some examples, the feedback resource for a conflict indication 220 that is associated with a broadcast sidelink message or a groupcast sidelink message may be a configured resource. For example, the UE 115-*a* may be configured with a feedback resource to use for conflict indication transmission associated with broadcast sidelink messages. Additionally, or alternatively, the UE 115-*a* may be configured with a feedback resource to use for conflict indication transmission associated with groupcast sidelink messages. In some other examples, the feedback resource may be a pre-configured resource. For example, the UE 115-*a* may be pre-configured with a feedback resource to use for conflict indication transmission associated with broadcast sidelink messages. Additionally, or alternatively, the UE 115-*a* may be pre-configured with a feedback resource to use for conflict indication transmission associated with groupcast sidelink messages.

Figure 3A:
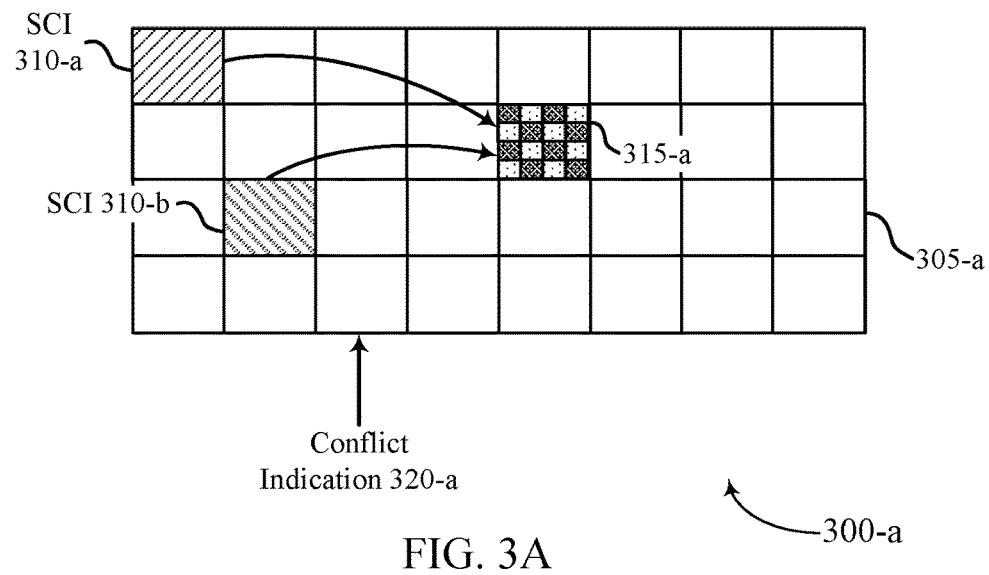
FIGS. 3A, 3B, and 3C illustrate examples of sidelink resource schemes that support sidelink conflict indication in accordance with aspects of the present disclosure.
Figure 3B:
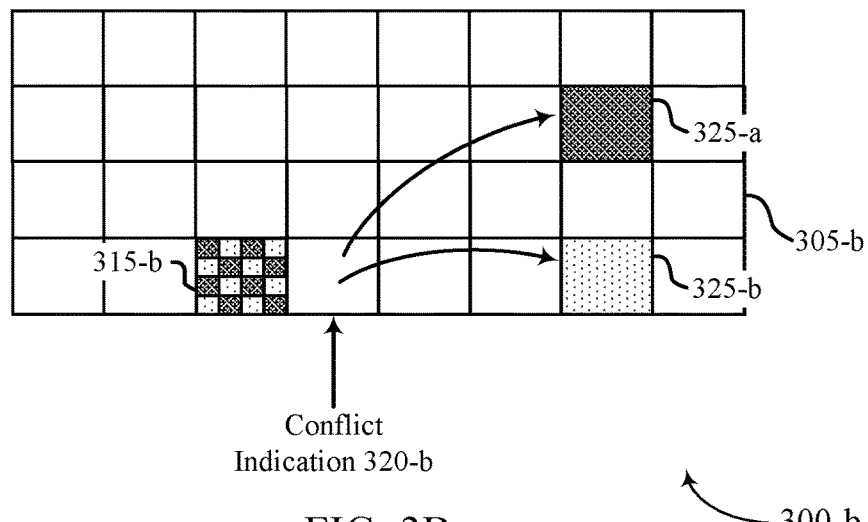
Figure 3C:
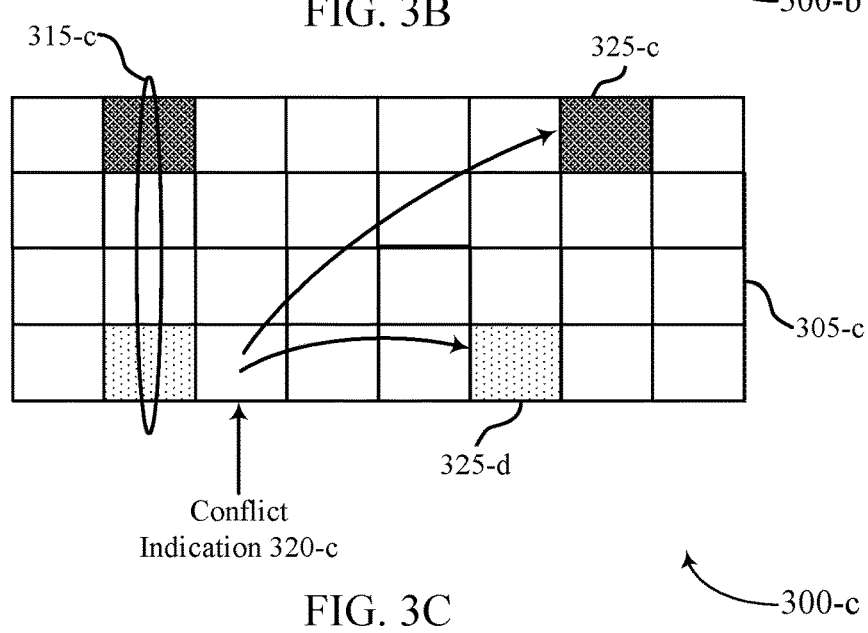

FIGS. 3A, 3B, and 3C illustrate examples of sidelink resource schemes 300-*a*, 300-*b*, and 300-*c* that support sidelink conflict indication in accordance with aspects of the present disclosure. In some examples, sidelink resource schemes 300-*a*, 300-*b*, and 300-*c* may implement aspects of wireless communication system 200, for example, the sidelink resource schemes may be examples of a sidelink resource pool 210 described with reference to FIG. 2. The sidelink resource schemes 300-*a*, 300-*b*, and 300-*c* may support various examples of sidelink conflict indication implemented at devices such as UEs 115 described with reference to FIGS. 1 and 2.

A wireless communications system may support resource scheduling for sidelink communications between devices. For example, the resource scheduling may be reservation based, such that devices may reserve sidelink resources for transmission of sidelink data. In the example of sidelink communications, sidelink resource allocation may be associated with slots in the time domain and subchannels (including a number of resource blocks) in the frequency domain. In some examples, sidelink resource reservations are indicated in a current slot or up to a number of future slots (e.g., up to two future slots), or both, for the transmission of sidelink data. In some cases, resource allocation may be based on a periodicity.

FIG. 3A shows an example of sidelink resource scheme 300-a in which a UE 115 may transmit a conflict indication 320-a prior to a corresponding conflict 315-a. The sidelink resource scheme 300-a depicts a sidelink resource pool 305-a usable by the UE 115 to reserve sidelink resources or to identify already reserved sidelink resources.

For example, the UE 115 may receive and decode SCI 310-a that reserves sidelink resources in a first slot and subchannel for transmission of a first sidelink message and may receive and decode SCI 310-b that reserves sidelink resources in the first slot and subchannel for transmission of a second sidelink message. The UE 115 may identify a conflict 315-a that results from the reservation of the sidelink resources by SCI 310-a and SCI 310-b. In some examples, the UE 115 may identify the conflict 315-a prior to the occurrence of the conflict 315-a. In other words, decoding the SCI 310-a and the SCI 310-b may indicate a future conflict.

In response to identifying the conflict 315-a, the UE 115 may measure a system load of a sidelink channel for the first sidelink message and the second sidelink message and may determine a threshold system load (e.g., based on one or more of a first priority associated with the first sidelink message and a second priority associated with the second sidelink message). The UE 115 may compare the system load to the threshold system load and may transmit or refrain from transmitting the conflict indication 320-a based on whether the system load satisfies the threshold system load. In the example of FIG. 3A, the conflict indication 320-a may preempt transmission of the first sidelink message, or the second sidelink message, or both.

FIG. 3B shows an example of sidelink resource scheme 300-b in which a UE 115 may transmit a conflict indication 320-b after a corresponding conflict 315-b. The sidelink resource scheme 300-b depicts a sidelink resource pool 305-b usable by the UE 115 to reserve sidelink resources or to identify already reserved sidelink resources.

For example, the UE 115 may identify a conflict 315-b between a first sidelink message and a second sidelink message. In some examples, the UE 115 may identify that conflict 315-b has occurred by decoding SCI reserving sidelink resources for the first sidelink message and decoding SCI reserving sidelink resources for the second sidelink message. In some other examples, the UE 115 may decode SCI for the first sidelink message prior to the conflict 315-b and may decode SCI for the second sidelink message during or after the conflict 315-b.

In response to identifying the conflict 315-b, the UE 115 may measure a system load of a sidelink channel for the first sidelink message and the second sidelink message and may determine a threshold system load (e.g., based on one or more of a first priority associated with the first sidelink message and a second priority associated with the second sidelink message). The UE 115 may compare the system load to the threshold system load and may transmit or refrain from transmitting the conflict indication 320-b based on whether the system load satisfies the threshold system load. In the example of FIG. 3B, the conflict indication 320-b may indicate retransmission of the first sidelink message, or the second sidelink message, or both. For example, the conflict indication 320-b may indicate a second UE 115 to retransmit the first sidelink message using a resource 325-a, or may indicate a third UE 115 to retransmit the second sidelink message using a resource 325-b, or both.

FIG. 3C shows an example of sidelink resource scheme 300-c in which a UE 115 may transmit a conflict indication 320-c associated with a half-duplex conflict. The sidelink resource scheme 300-b depicts a sidelink resource pool 305-b usable by the UE 115 to reserve sidelink resources or to identify already reserved sidelink resources.

For example, the UE 115 may identify a conflict 315-c between a first sidelink message and a second sidelink message that corresponds to a half-duplex conflict. That is, if UEs 115 are configured for half-duplex communications, sidelink messages that overlap in time may result in half-duplex conflicts, in which one or more of the first sidelink message or the second sidelink message may not be received. In some examples, the UE 115 may identify that conflict 315-c has occurred by decoding SCI reserving sidelink resources for the first sidelink message and decoding SCI reserving sidelink resources for the second sidelink message. In some other examples, the UE 115 may decode SCI for the first sidelink message prior to the conflict 315-c and may decode SCI for the second sidelink message during or after the conflict 315-c.

In response to identifying the conflict 315-c, the UE 115 may measure a system load of a sidelink channel for the first sidelink message and the second sidelink message and may determine a threshold system load (e.g., based on one or more of a first priority associated with the first sidelink message and a second priority associated with the second sidelink message). The UE 115 may compare the system load to the threshold system load and may transmit or refrain from transmitting the conflict indication 320-c based on whether the system load satisfies the threshold system load. In the example of FIG. 3C, the conflict indication 320-c may indicate retransmission of the first sidelink message, or the second sidelink message, or both. For example, the conflict indication 320-c may indicate a second UE 115 to retransmit the first sidelink message using a resource 325-c, or may indicate a third UE 115 to retransmit the second sidelink message using a resource 325-d, or both. Here, the resource 325-c and the resource 325-d may be associated with different slots (e.g., may not overlap in time).

Figure 4:
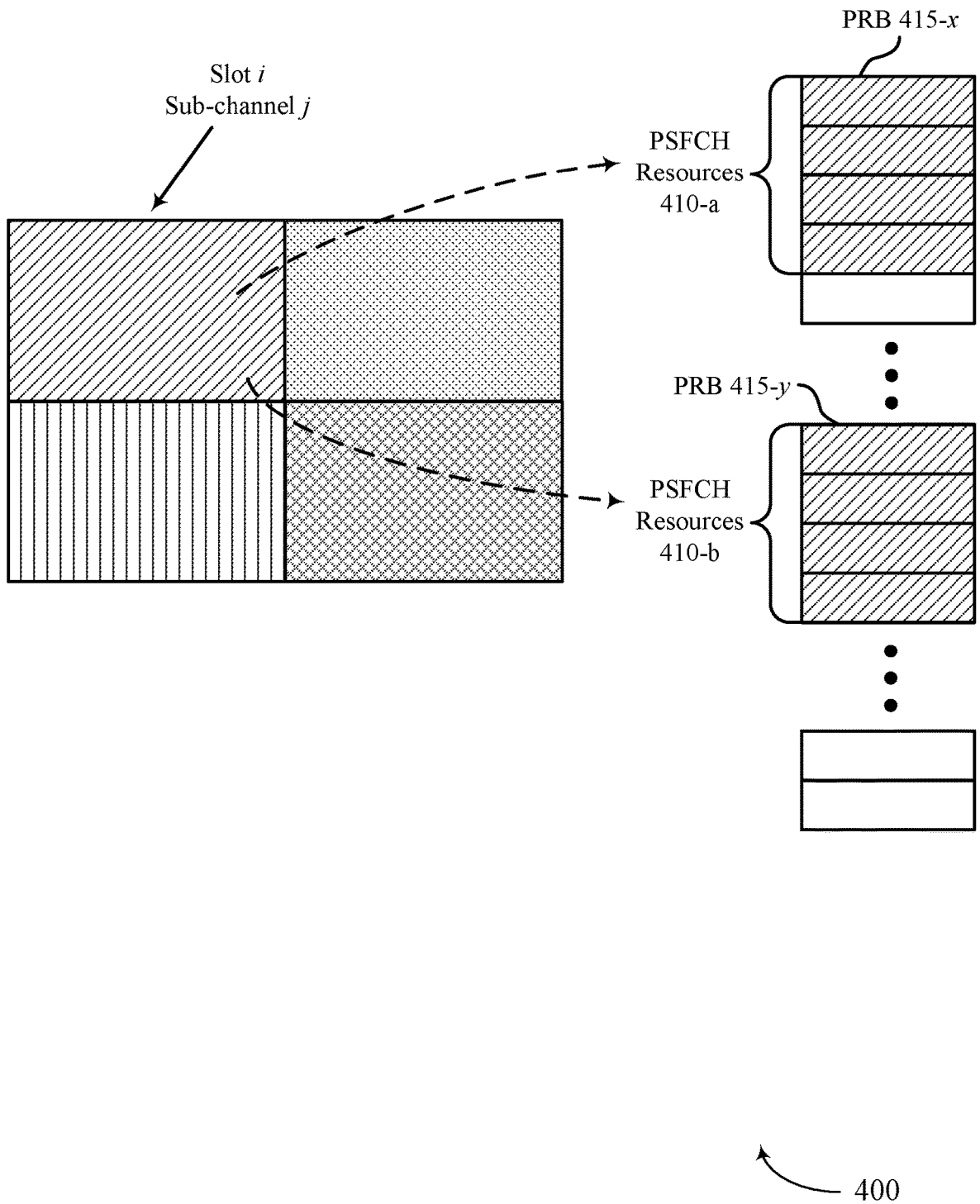
FIG. 4 illustrates an example of a resource mapping that supports sidelink conflict indication in accordance with aspects of the present disclosure.

FIG. 4 illustrates an example of a resource mapping 400 that supports sidelink conflict indication in accordance with aspects of the present disclosure. In some examples, the resource mapping 400 may implement aspects of the wireless communications systems 100 and 200 as described with reference to FIGS. 1 and 2, respectively. For example, the resource mapping 400 may be implemented by a UE 115, which may be an example of a UE 115 as described with reference to FIGS. 1 and 2, respectively. The resource mapping 400 may be implemented by the UE 115 to support transmission of conflict indications for sidelink messages associated with cast types having no or having multiple corresponding feedback resources.

The UE 115 may identify a conflict between sidelink messages. For example, the UE 115 identify a conflict between sidelink messages in a slot i, sub-channel j, of a sidelink channel (e.g., a PSCCH, a PSSCH, or some other sidelink channel), where i and j are positive integers that are greater than or equal to one. The UE 115 may determine a feedback resource of a PSFCH to use to transmit a conflict indication in response to identifying the conflict. The UE 115 may determine the feedback resource using a feedback mapping rule that maps sidelink channel resources to PSFCH resources. That is, the UE 115 may map the location of the conflict (e.g., slot i, sub-channel j) to a corresponding feedback resource using the feedback mapping rule. The feedback resource may be one or more PRBs 415 of the PSFCH. For example, one PRB may be used when a one-to-one mapping is performed at the UE 115, or multiple PRBs may be used when a one-to-many mapping is performed at the UE 115.

The UE 115 determine one or more parameters associated with the feedback mapping rule. For example, a first Z PRBs may be associated with a first sub-channel in a first slot associated with the PSFCH, a second Z PRBs may be associated with the first sub-channel in a second slot associated with the PSFCH, and/or the like, where Z is a positive integer greater than or equal to one. The UE 115 may determine a feedback resource of the PSFCH having an index ((K+M) mod (Z*Y)) for transmission of the conflict indication, where K is a layer 1 (L1) source identifier (ID) of an associated PSCCH or an associated PSSCH (which carries the reservation), M is an integer whose value is based on a cast type of one or more sidelink messages associated with the conflict, and Y is a number of cyclic shift pairs for the PSFCH.

The UE 115 may determine the value of M based on a cast type of one or more sidelink messages associated with the conflict. For example, the UE 115 may determine that SCI used to reserve resources for a sidelink message of the conflicting sidelink messages is associated with a broadcast sidelink message. Here, the UE 115 may determine that M is 0. This is because, for unicast sidelink messages and groupcast-Option1 sidelink messages, M is 0. In other words, the UE 115 may apply a feedback mapping rule used to determine a feedback resource for a unicast sidelink message and/or a groupcast-Option1 sidelink message in order to determine the feedback resource for transmission of a conflict indication that is associated with a broadcast sidelink message. In the example of FIG. 4, the UE 115 may determine to use PSFCH resources 410-a with a starting index of PRB 415-x to transmit the conflict indication, where x is an integer greater than or equal to 0. While PSFCH resources 410-a are shown to include four PRBs 415, any number of PRBs 415 may be included in PSFCH resources 410-a.

In some examples, the UE 115 may determine that the SCI is associated with a groupcast-Option2 sidelink message. Here, the UE 115 may determine the value of M based on whether the UE 115 is a member of a group associated with the groupcast-Option2 sidelink message. In a first example, if the UE 115 is a member of the group, the UE 115 may set M equal to the group size of the group. In this way, the UE 115 may select a feedback resource that is unused by any other member of the group. In the example of FIG. 4, the UE 115 may determine to use PSFCH resources 410-b with a starting index of PRB 415-y to transmit the conflict indication, where y is an integer greater than or equal to 0. While PSFCH resources 410-b are shown to include four PRBs 415, any number of PRBs 415 may be included in PSFCH resources 410-b. In a second example, if the UE 115 is exclusive to (e.g., not a member of) the group, the UE 115 may set M to 0. Thus, if the UE 115 determines that the UE 115 is exclusive to the group, the UE 115 may apply a feedback mapping rule used to determine a feedback resource for a unicast sidelink message and/or a groupcast-Option1 sidelink message in order to determine the feedback resource for transmission of the conflict indication. In the example of FIG. 4, the UE 115 may determine to use PSFCH resources 410-a to transmit the conflict indication In some examples, the feedback resource used to transmit may the conflict indication may be a configured resource or a pre-configured resource. For example, the UE 115 may be configured or pre-configured with a feedback resource that is used to transmit a conflict indication associated with a broadcast sidelink message. Additionally, or alternatively, the UE 115 may be configured or pre-configured with a feedback resource that is used to transmit a conflict indication associated with a groupcast sidelink message having multiple corresponding feedback resources (e.g., a groupcast-Option2 sidelink message). In either example, the UE 115 may forgo using a feedback mapping rule to determine the feedback resource and instead may use the configured or pre-configured resource.

Figure 5:
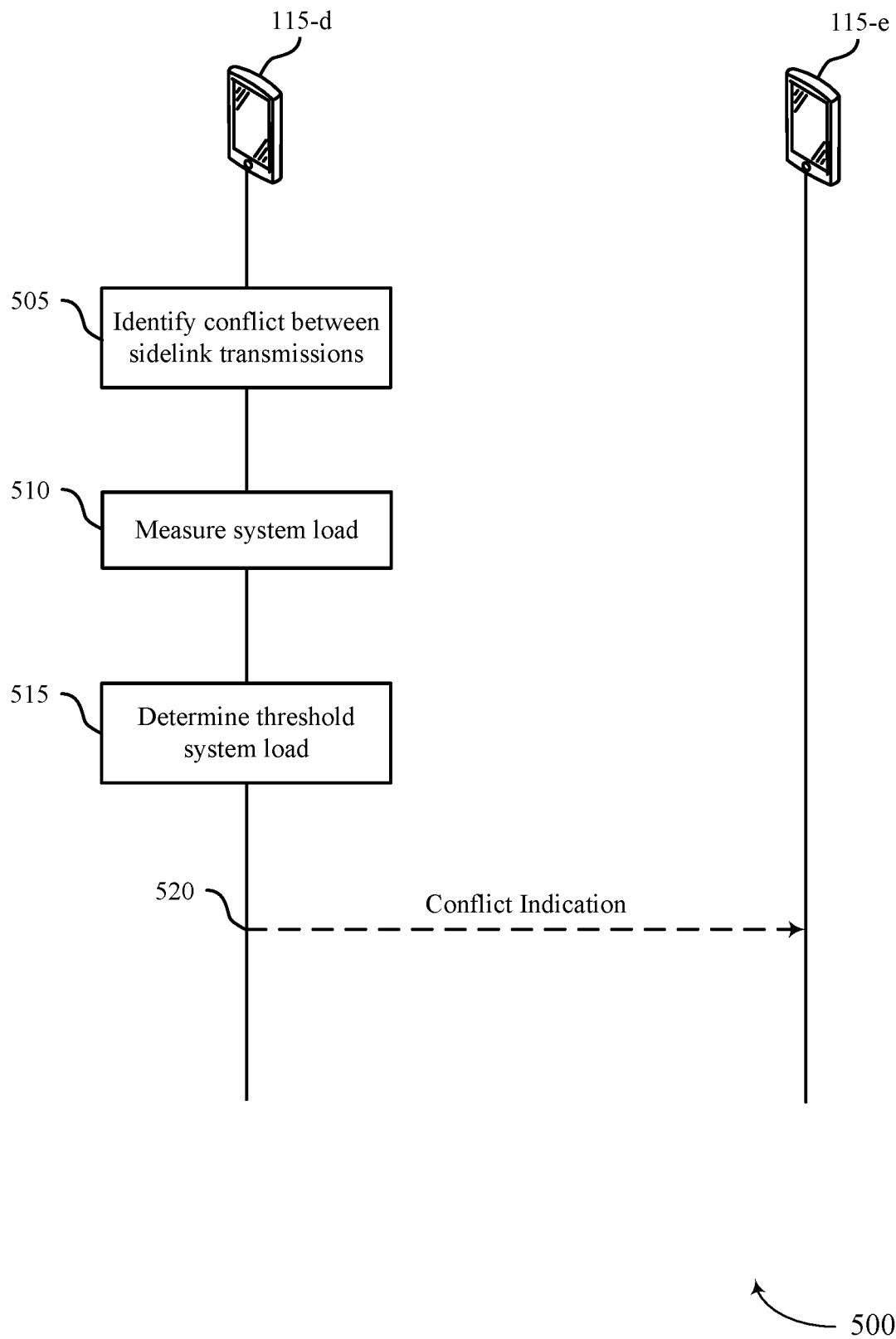
FIGS. 5, 6, and 7 illustrate examples of process flows that support sidelink conflict indication in accordance with aspects of the present disclosure.

FIG. 5 illustrates an example of a process flow 500 that supports sidelink conflict indication in accordance with aspects of the present disclosure. In some examples, the process flow 500 may implement aspects of the wireless communications systems 100 and 200 as described with reference to FIGS. 1 and 2, respectively. For example, the process flow 500 may be implemented by a UE 115-d and a UE 115-e, which may be examples of a UE 115 as described with reference to FIGS. 1 and 2. The process flow 500 may be implemented by the UE 115-d and the UE 115-e to support sidelink conflict indication based on a system load. The process flow 500 may further be implemented by the UE 115-d and the UE 115-e to potentially reduce channel congestion and system load and increase reliability of sidelink messages (e.g., based on transmitting sidelink conflict indications according to a system load), among other benefits.

In the following description of the process flow 500, the operations between the UE 115-d and the UE 115-e may be communicated in a different order than the example order shown, or the operations performed by the UE 115-d and the UE 115-e may be performed in different orders or at different times. Some operations may also be omitted from the process flow 500, and other operations may be added to the process flow 500.

At 505, the UE 115-d may identify a conflict between sidelink messages. For example, the UE 115-e may reserve a set of sidelink resources for transmission of at least a first sidelink message. In some cases, a sidelink resource reserved for transmission of the first sidelink message may conflict with a sidelink resource reserved for transmission of a second sidelink message by a different UE 115 (not shown). In some examples, the UE 115-e and the different UE 115 may each reserve the sidelink resource by transmitting an SCI, and the UE 115-d may identify the conflict based on decoding the SCI received from the UE 115-e and the different UE 115.

At 510, the UE 115-d may measure a system load of a sidelink channel for the conflicting sidelink messages (e.g., the first sidelink message and the second sidelink message) in response to identifying the conflict. For example, the UE 115-d may measure a CBR of the sidelink channel, a CR of the sidelink channel, or a combination thereof, to determine a system load of the sidelink channel.

At 515, the UE 115-*d* may determine a threshold system load of the sidelink channel. In some examples, the UE 115-*d* may determine a threshold system load based on a first priority of the first sidelink message or a second priority of the second sidelink message. For example, the UE 115-*d* may determine which priority of the first priority or the second priority is higher and may select a threshold system load (e.g., from a set of threshold system loads) that corresponds to the higher priority.

At 520, the UE 115-*d* optionally transmit a conflict indication to the UE 115-*e*. For example, if the measured system load is less than (or equal to) the threshold system load, the UE 115-*d* may transmit the conflict indication. Alternatively, if the measured system load is greater than (or equal to) the threshold system load, the UE 115-*d* may refrain from transmitting the conflict indication.

Figure 6:
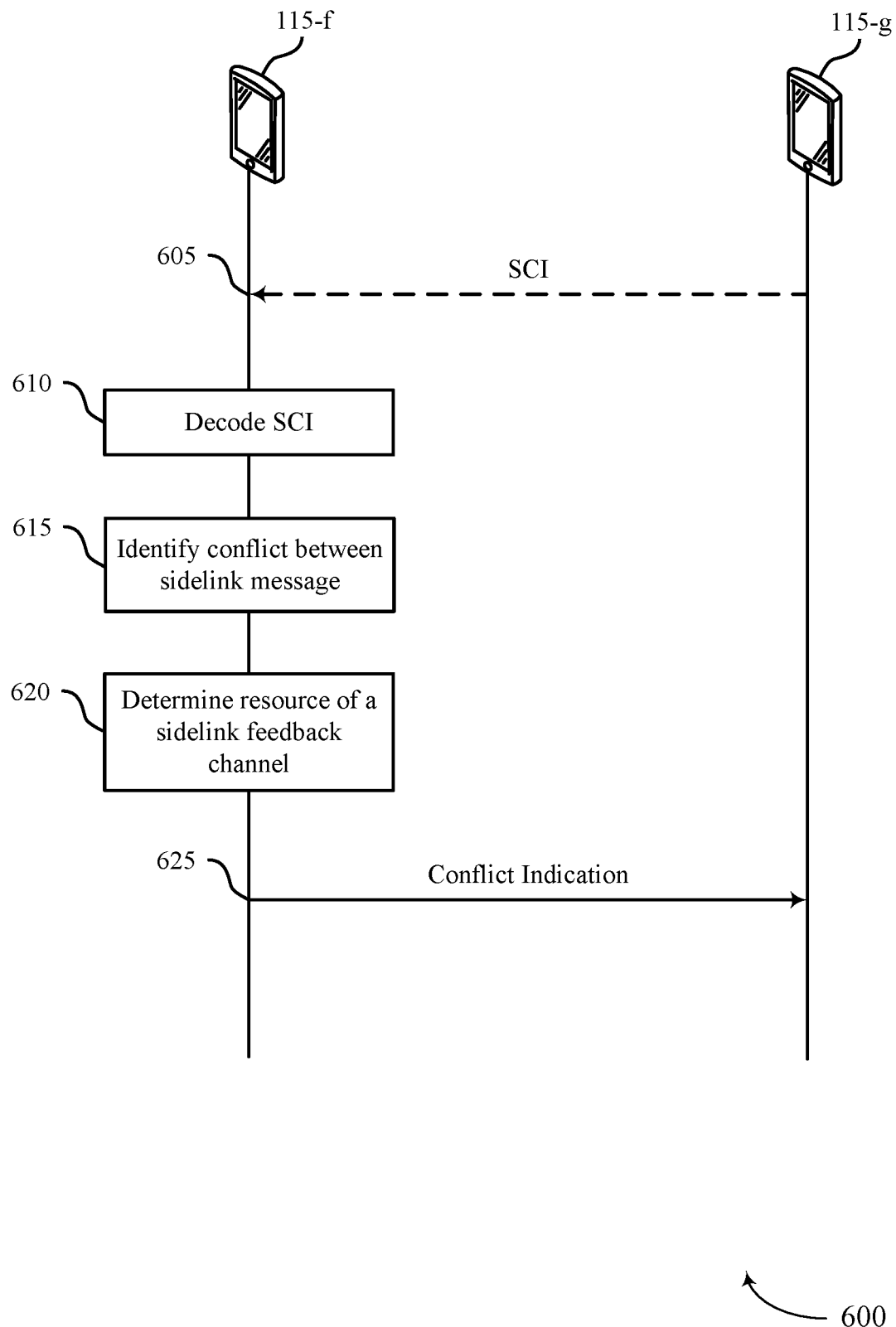

FIG. 6 illustrates an example of a process flow 600 that supports sidelink conflict indication in accordance with aspects of the present disclosure. In some examples, the process flow 600 may implement aspects of the wireless communications systems 100 and 200 as described with reference to FIGS. 1 and 2, respectively. For example, the process flow 600 may be implemented by a UE 115-*f* and a UE 115-*g*, which may be examples of a UE 115 as described with reference to FIGS. 1 and 2. The process flow 600 may be implemented by the UE 115-*f* and the UE 115-*g* to support sidelink conflict indication according to cast type. The process flow 600 may further be implemented by the UE 115-*f* and the UE 115-*g* to improve resource utilization efficiency associated with transmitting sidelink messages (e.g., based on transmitting sidelink conflict indications according to cast type), among other benefits.

In the following description of the process flow 600, the operations between the UE 115-*f* and the UE 115-*g* may be communicated in a different order than the example order shown, or the operations performed by the UE 115-*f* and the UE 115-*g* may be performed in different orders or at different times. Some operations may also be omitted from the process flow 600, and other operations may be added to the process flow 600.

At 605, UE 115-*g* may transmit SCI to the UE 115-*f* via a sidelink control channel (e.g., a PSCCH), and the UE 115-*f* may receive the SCI on the sidelink control channel.

At 610, the UE 115-*f* may decode the SCI received from UE 115-*g* in the sidelink control channel. In some examples, the SCI may indicate a set of sidelink resources that are reserved for transmission by UE 115-*g*. The SCI may be associated with a particular cast type, such as broadcast or groupcast.

At 615, the UE 115-*f* may identify, based on the SCI, a conflict (e.g., a time overlap, a frequency overlap, or both) between sidelink messages in one or more sidelink resources of the set of sidelink resources. In some aspects, the conflict may be a conflict between reserved resources of a sidelink channel. In some examples, the UE 115-*f* may determine, based at least in part on the SCI, that the conflict scheduled in the sidelink resource is occurring presently, has occurred in the past, or will occur in the future. In some cases, the UE 115-*f* may implement techniques such as interference cancellation to identify the conflict.

At 620, the UE 115-*f* may determine a resource of a sidelink feedback channel for transmission of a conflict indication that indicates the conflict. The UE 115-*f* may determine the resource based on the cast type associated with the SCI. For example, if the SCI is associated with a broadcast sidelink message, the UE 115-*f* may determine the resource using a feedback mapping rule that is used to determine a resource of the sidelink feedback channel for unicast sidelink messages and groupcast-Option1 sidelink messages. If the SCI is associated with a groupcast sidelink message, the UE 115-*f* may determine the resource based on a group size of a group associated with the groupcast sidelink message or using the feedback mapping rule associated with unicast sidelink messages or groupcast-Option1 sidelink messages. Additionally, or alternatively, the resource of the sidelink feedback channel may be a configured resource or a pre-configured resource.

At 625, the UE 115-*f* may transmit, using the determined a resource, the conflict indication to the UE 115-*g*. In some examples, the conflict indication may preempt transmission of a sidelink message by the UE 115-*g* that is associated with the conflict. In some other examples, the conflict indication may prompt retransmission of the sidelink message by the UE 115-*g* that is associated with the conflict.

Figure 7:
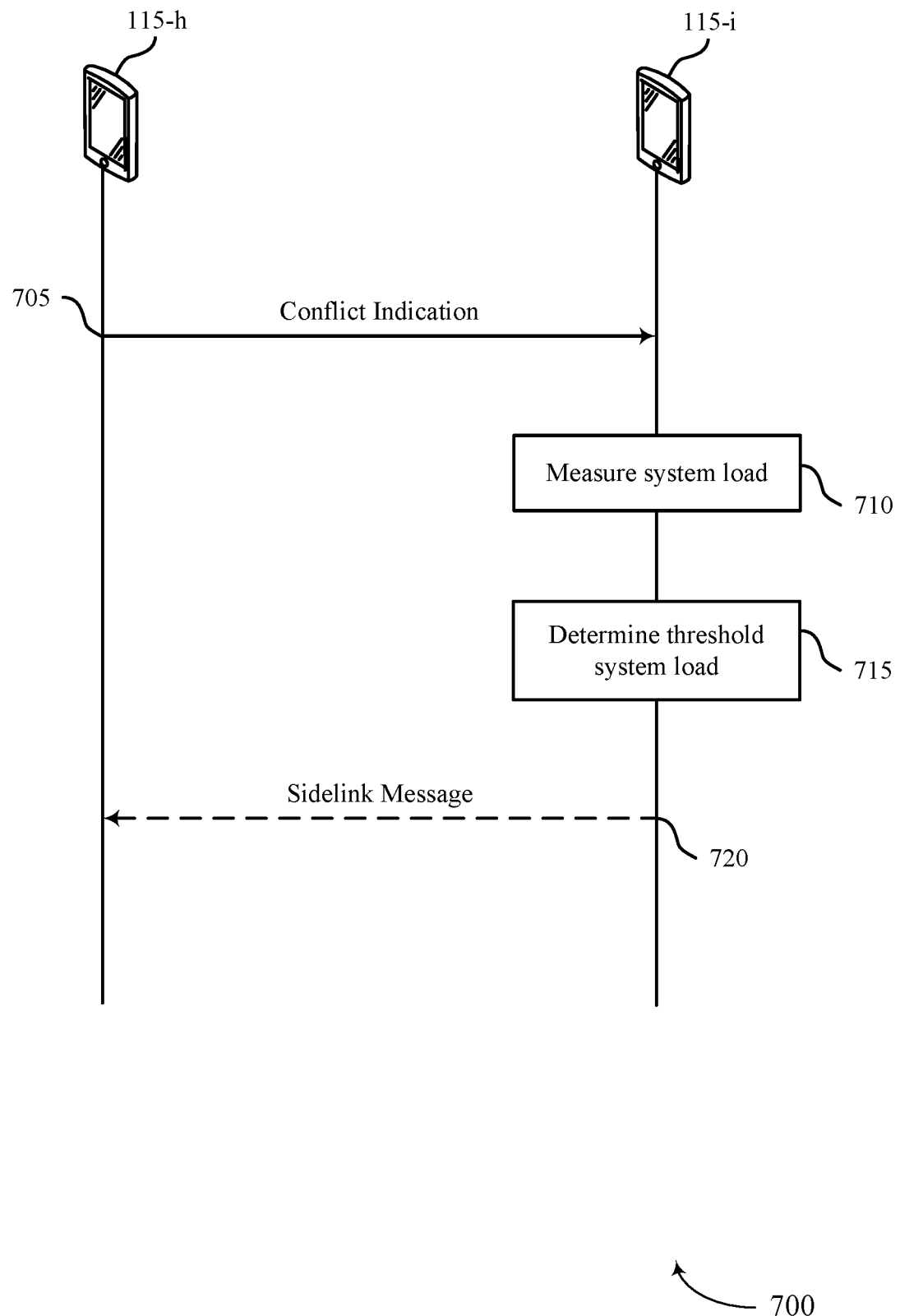

FIG. 7 illustrates an example of a process flow 700 that supports sidelink conflict indication in accordance with aspects of the present disclosure. In some examples, the process flow 700 may implement aspects of the wireless communications systems 100 and 200 as described with reference to FIGS. 1 and 2, respectively. For example, the process flow 700 may be implemented by a UE 115-*h* and a UE 115-*i*, which may be examples of a UE 115 as described with reference to FIGS. 1 and 2. The process flow 500 may be implemented by the UE 115-*h* and the UE 115-*i* to support sidelink message transmission based on a system load. The process flow 700 may further be implemented by the UE 115-*h* and the UE 115-*i* to potentially reduce channel congestion and system load and increase reliability of sidelink messages (e.g., based on transmitting conflicting sidelink messages according to a system load), among other benefits.

In the following description of the process flow 700, the operations between the UE 115-*h* and the UE 115-*i* may be communicated in a different order than the example order shown, or the operations performed by the UE 115-*h* and the UE 115-*i* may be performed in different orders or at different times. Some operations may also be omitted from the process flow 700, and other operations may be added to the process flow 700.

At 705, UE 115-*h* may transmit a conflict indication to the UE 115-*i*, and the UE 115-*i* may receive the conflict indication. The conflict indication may indicate a conflict between sidelink messages in one or more sidelink resources of a set of sidelink resources reserved for communications by the UE 115-*i*. For example, the UE 115-*i* may reserve the set of sidelink resources to transmit at least a first sidelink message. In some examples, one or more sidelink resources of the set may conflict with one or more sidelink resources reserved for transmission of a second UE by a different UE (not shown). Accordingly, the UE 115-*i* may receive the conflict indication from the UE 115-*h* that indicates the conflict.

At 710, the UE 115-*i* may measure a system load of a sidelink channel for the conflicting sidelink messages, for example, in response to receiving the conflict indication. For example, the UE 115-*i* may measure a CBR of the sidelink channel, a CR of the sidelink channel, or a combination thereof, to determine a system load of the sidelink channel.

At 715, the UE 115-*i* may determine a threshold system load. In some examples, the UE 115-*i* may determine a threshold system load that corresponds to a priority of the first sidelink message. For example, the UE 115-*i* may determine the priority of the first sidelink message and may select a threshold system load (e.g., from a set of threshold system loads) that corresponds to the determined priority.

At 720, the UE 115-*i* may optionally transmit the first sidelink message. For example, if the measured system load is less than (or equal to) the threshold system load, the UE 115-*i* may transmit the first sidelink message (e.g., despite the conflict indication preempting transmission of the first sidelink message). Alternatively, if the measured system load is greater than (or equal to) the threshold system load, the UE 115-*i* may refrain from transmitting (e.g., preempt transmission of) the first sidelink message.

Figure 8:
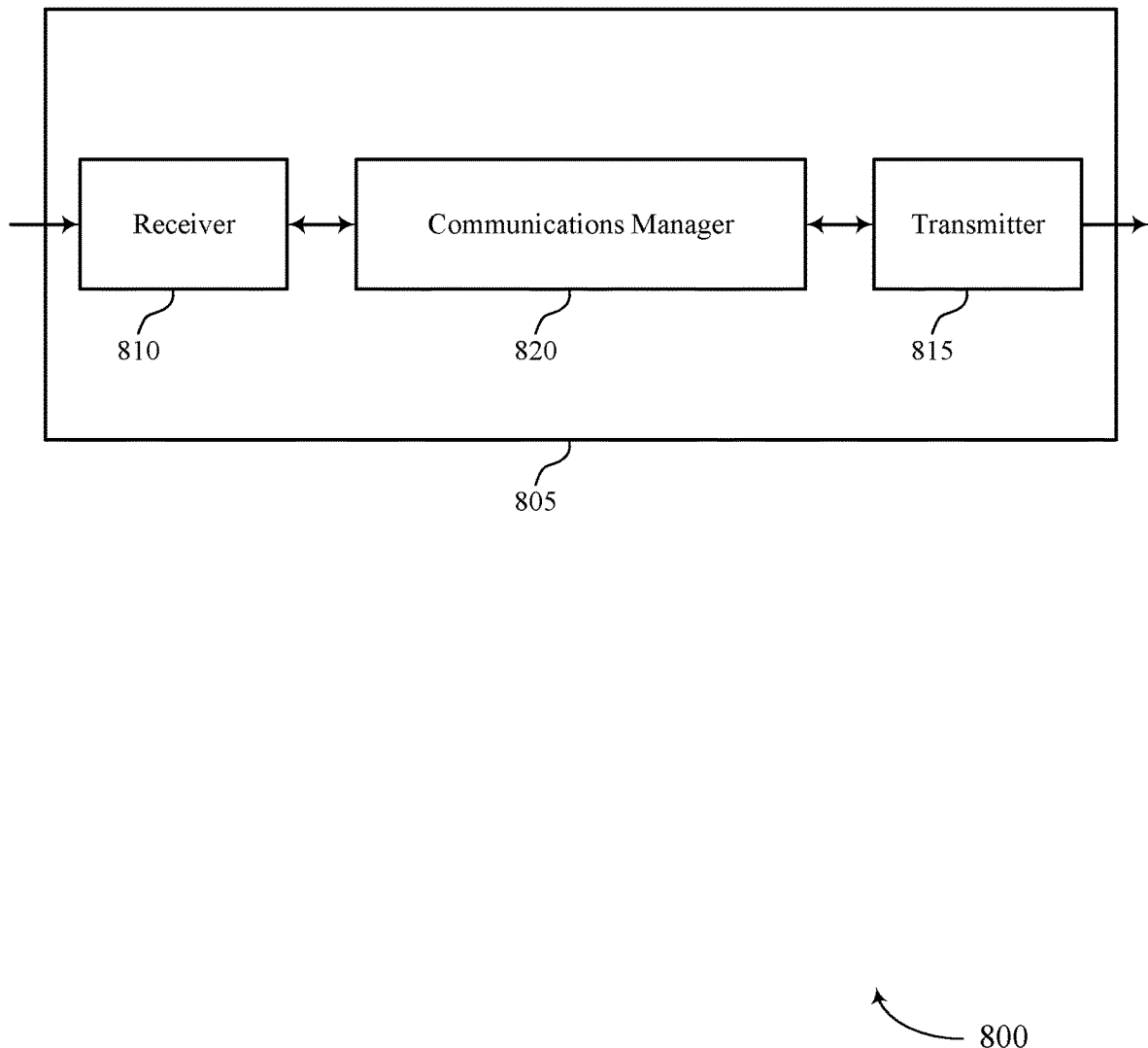
FIGS. 8 and 9 show block diagrams of devices that support sidelink conflict indication in accordance with aspects of the present disclosure.

FIG. 8 shows a block diagram 800 of a device 805 that supports sidelink conflict indication in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to sidelink conflict indication). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to sidelink conflict indication). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of sidelink conflict indication as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. For example, the communications manager 820 may be configured as or otherwise support a means for identifying a conflict between sidelink transmissions in one or more sidelink resources of a set of sidelink resources reserved for communications by a second UE. The communications manager 820 may be configured as or otherwise support a means for measuring a system load of a sidelink channel for the sidelink transmissions based on identifying the conflict. The communications manager 820 may optionally be configured as or otherwise support a means for determining a threshold system load of the sidelink channel. In some examples, the communications manager 820 may be configured as or otherwise support a means for determining a threshold system load of the sidelink channel based on one or more priorities associated with the sidelink transmissions. The communications manager 820 may be configured as or otherwise support a means for transmitting a message including an indication of the conflict based on the system load satisfying the threshold system load.

Additionally or alternatively, the communications manager 820 may support wireless communication at a first UE in accordance with examples as disclosed herein. For example, the communications manager 820 may be configured as or otherwise support a means for decoding SCI from a second UE that indicates a set of sidelink resources reserved for communications by the second UE, the SCI associated with a broadcast sidelink message or a groupcast sidelink message. The communications manager 820 may be configured as or otherwise support a means for identifying, based on the SCI, a conflict between sidelink messages in one or more sidelink resources of the set of sidelink resources. The communications manager 820 may be configured as or otherwise support a means for determining a resource of a sidelink feedback channel for transmission of an indication of the conflict based on whether the SCI is associated with the broadcast sidelink message or the groupcast sidelink message. The communications manager 820 may be configured as or otherwise support a means for transmitting a message including the indication of the conflict using the sidelink feedback channel and the determined resource.

Additionally or alternatively, the communications manager 820 may support wireless communication at a first UE in accordance with examples as disclosed herein. For example, the communications manager 820 may be configured as or otherwise support a means for receiving, from a second UE, a message that indicates a conflict between sidelink messages in one or more sidelink resources of a set of sidelink resources reserved for communications by the first UE. The communications manager 820 may be configured as or otherwise support a means for measuring a system load of a sidelink channel for the sidelink messages based on receiving the message. The communications manager 820 may optionally be configured as or otherwise support a means for determining a threshold system load of the sidelink channel based on a priority of a sidelink message of the sidelink messages, the sidelink message associated with the first UE. The communications manager 820 may be configured as or otherwise support a means for transmitting the sidelink message based on the system load satisfying the threshold system load.

By including or configuring the communications manager 820 in accordance with examples as described herein, the device 805 (e.g., a processor controlling or otherwise coupled to the receiver 810, the transmitter 815, the communications manager 820, or a combination thereof) may improve communication resource utilization efficiency associated with transmitting sidelink messages. For example, by transmitting sidelink conflict indications and sidelink messages based on system load and by transmitting sidelink conflict indications according to cast type, the device 805 may reduce channel congestion and system load and increase reliability associated with transmitting sidelink messages (e.g., thereby reducing a number of retransmissions of sidelink messages)

Figure 9:
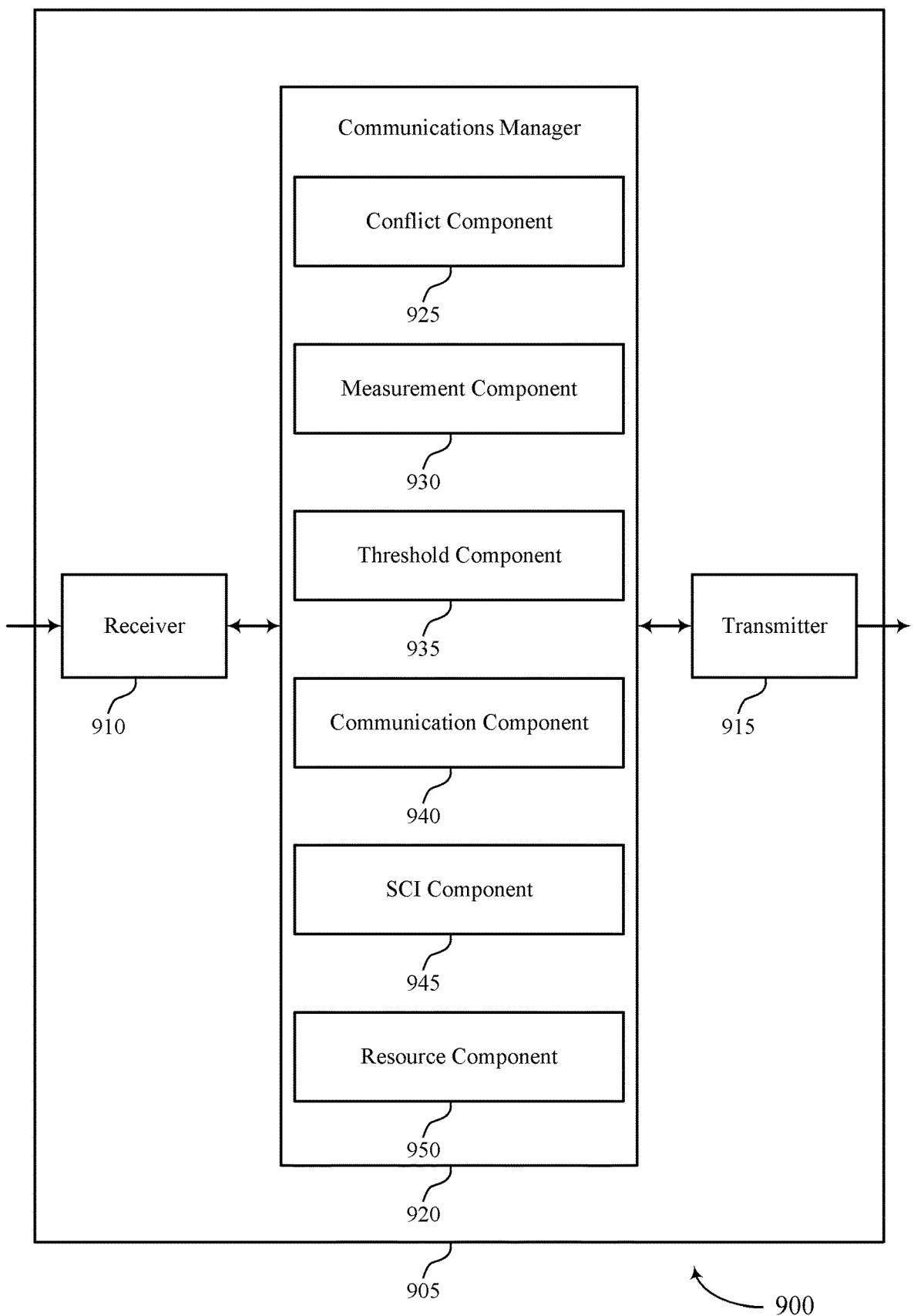

FIG. 9 shows a block diagram 900 of a device 905 that supports sidelink conflict indication in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to sidelink conflict indication). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to sidelink conflict indication). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of sidelink conflict indication as described herein. For example, the communications manager 920 may include a conflict component 925, a measurement component 930, a threshold component 935, a communication component 940, an SCI component 945, a resource component 950, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. The conflict component 925 may be configured as or otherwise support a means for identifying a conflict between sidelink transmissions in one or more sidelink resources of a set of sidelink resources reserved for communications by a second UE. The measurement component 930 may be configured as or otherwise support a means for measuring a system load of a sidelink channel for the sidelink transmissions based on identifying the conflict. The threshold component 935 may optionally be configured as or otherwise support a means for determining a threshold system load of the sidelink channel. In some examples, the threshold component 935 may be configured as or otherwise support a means for determining a threshold system load of the sidelink channel based on one or more priorities associated with the sidelink transmissions. The communication component 940 may be configured as or otherwise support a means for transmitting a message including an indication of the conflict based on the system load satisfying the threshold system load.

Additionally or alternatively, the communications manager 920 may support wireless communication at a first UE in accordance with examples as disclosed herein. The SCI component 945 may be configured as or otherwise support a means for decoding SCI from a second UE that indicates a set of sidelink resources reserved for communications by the second UE, the SCI associated with a broadcast sidelink message or a groupcast sidelink message. The conflict component 925 may be configured as or otherwise support a means for identifying, based on the SCI, a conflict between sidelink messages in one or more sidelink resources of the set of sidelink resources. The resource component 950 may be configured as or otherwise support a means for determining a resource of a sidelink feedback channel for transmission of an indication of the conflict based on whether the SCI is associated with the broadcast sidelink message or the groupcast sidelink message. The communication component 940 may be configured as or otherwise support a means for transmitting a message including the indication of the conflict using the sidelink feedback channel and the determined resource.

Additionally or alternatively, the communications manager 920 may support wireless communication at a first UE in accordance with examples as disclosed herein. The conflict component 925 may be configured as or otherwise support a means for receiving, from a second UE, a message that indicates a conflict between sidelink messages in one or more sidelink resources of a set of sidelink resources reserved for communications by the first UE. The measurement component 930 may be configured as or otherwise support a means for measuring a system load of a sidelink channel for the sidelink messages based on receiving the message. The threshold component 935 may optionally be configured as or otherwise support a means for determining a threshold system load of the sidelink channel based on a priority of a sidelink message of the sidelink messages, the sidelink message associated with the first UE. The communication component 940 may be configured as or otherwise support a means for transmitting the sidelink message based on the system load satisfying the threshold system load.

Figure 10:
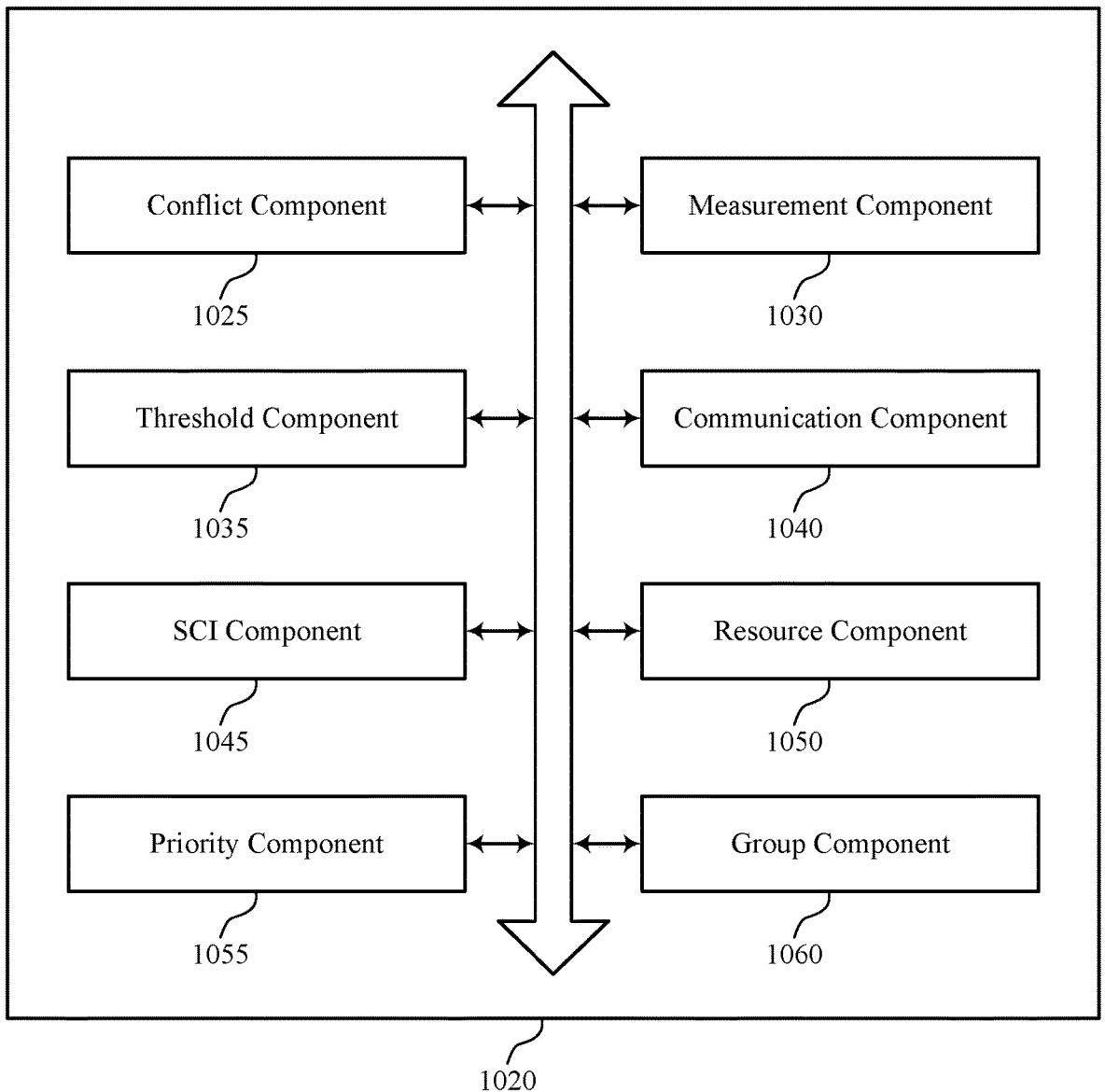
FIG. 10 shows a block diagram of a communications manager that supports sidelink conflict indication in accordance with aspects of the present disclosure.

FIG. 10 shows a block diagram 1000 of a communications manager 1020 that supports sidelink conflict indication in accordance with aspects of the present disclosure. The communications manager 1020 may be an example of aspects of a communications manager 820, a communications manager 920, or both, as described herein. The communications manager 1020, or various components thereof, may be an example of means for performing various aspects of sidelink conflict indication as described herein. For example, the communications manager 1020 may include a conflict component 1025, a measurement component 1030, a threshold component 1035, a communication component 1040, an SCI component 1045, a resource component 1050, a priority component 1055, a group component 1060, or any combination thereof. Each of these components may communicate, directly or indirectly, with one another (e.g., via one or more buses).

The communications manager 1020 may support wireless communication at a first UE in accordance with examples as disclosed herein. The conflict component 1025 may be configured as or otherwise support a means for identifying a conflict between sidelink transmissions in one or more sidelink resources of a set of sidelink resources reserved for communications by a second UE. The measurement component 1030 may be configured as or otherwise support a means for measuring a system load of a sidelink channel for the sidelink transmissions based on identifying the conflict. The threshold component 1035 may optionally be configured as or otherwise support a means for determining a threshold system load of the sidelink channel. The communication component 1040 may be configured as or otherwise support a means for transmitting a message including an indication of the conflict based on the system load satisfying the threshold system load.

In some examples, the threshold component 1035 may be configured as or otherwise support a means for determining a threshold system load of the sidelink channel based on one or more priorities associated with the sidelink transmissions.

In some examples, the priority component 1055 may be configured as or otherwise support a means for determining a priority of a sidelink transmission of the sidelink transmissions, where the sidelink transmission is associated with a highest priority of the sidelink transmissions. In some examples, the threshold component 1035 may be configured as or otherwise support a means for selecting the threshold system load from a set of threshold system loads based on the priority of the sidelink transmission that is associated with the highest priority.

In some examples, the set of threshold system loads is configured or pre-configured for the first UE, and each of the set of threshold system loads corresponds to a respective priority of a set of priorities for sidelink communications.

In some examples, the conflict component 1025 may be configured as or otherwise support a means for identifying a second conflict between second sidelink transmissions one or more sidelink resources of a second set of sidelink resources reserved for communications by the second UE. In some examples, the measurement component 1030 may be configured as or otherwise support a means for measuring a second system load of the sidelink channel for the second sidelink transmissions based on identifying the second conflict. In some examples, the threshold component 1035 may be configured as or otherwise support a means for determining a second threshold system load of the sidelink channel based on one or more priorities associated with the second sidelink transmissions. In some examples, the communication component 1040 may be configured as or otherwise support a means for refraining from transmitting a second message including an indication of the second conflict based on the second system load failing to satisfy the second threshold system load.

In some examples, to support measuring the system load of the sidelink channel, the measurement component 1030 may be configured as or otherwise support a means for measuring a CR associated with the sidelink channel, a CBR associated with the sidelink channel, or both.

In some examples, the conflict between sidelink transmissions includes a time overlap of the one or more sidelink resources, a frequency overlap of the one or more sidelink resources, or both.

In some examples, to support transmitting the message including the indication of the conflict, the communication component 1040 may be configured as or otherwise support a means for transmitting the message including the indication of the conflict after the conflict has occurred, where the indication of the conflict indicates retransmission of a sidelink transmission by the second UE.

In some examples, to support transmitting the message including the indication of the conflict, the communication component 1040 may be configured as or otherwise support a means for transmitting the message including the indication of the conflict prior to the conflict occurring, where the indication of the conflict indicates the second UE to refrain from transmitting a sidelink transmission.

Additionally or alternatively, the communications manager 1020 may support wireless communication at a first UE in accordance with examples as disclosed herein. The SCI component 1045 may be configured as or otherwise support a means for decoding SCI from a second UE that indicates a set of sidelink resources reserved for communications by the second UE, the SCI associated with a broadcast sidelink message or a groupcast sidelink message. In some examples, the conflict component 1025 may be configured as or otherwise support a means for identifying, based on the SCI, a conflict between sidelink messages in one or more sidelink resources of the set of sidelink resources. The resource component 1050 may be configured as or otherwise support a means for determining a resource of a sidelink feedback channel for transmission of an indication of the conflict based on whether the SCI is associated with the broadcast sidelink message or the groupcast sidelink message. In some examples, the communication component 1040 may be configured as or otherwise support a means for transmitting a message including the indication of the conflict using the sidelink feedback channel and the determined resource.

In some examples, the SCI component 1045 may be configured as or otherwise support a means for determining that the SCI is associated with the broadcast sidelink message, where the resource of the sidelink feedback channel is determined based on a feedback mapping rule associated with a unicast sidelink message or a second groupcast sidelink message.

In some examples, the SCI component 1045 may be configured as or otherwise support a means for determining that the SCI is associated with the groupcast sidelink message. In some examples, the group component 1060 may be configured as or otherwise support a means for determining that the second UE is a member of a group associated with the groupcast sidelink message, where the resource of the sidelink feedback channel is determined based on a group size of the group associated with the groupcast sidelink message.

In some examples, the SCI component 1045 may be configured as or otherwise support a means for determining that the SCI is associated with the groupcast sidelink message. In some examples, the group component 1060 may be configured as or otherwise support a means for determining that the second UE is exclusive of a group associated with the groupcast sidelink message. In some examples, the resource component 1050 may be configured as or otherwise support a means for applying a feedback mapping rule associated with determining a feedback resource associated with a unicast sidelink message or a groupcast-option1 sidelink message to determine the resource of the sidelink feedback channel.

In some examples, the determined resource is a configured resource for the broadcast sidelink message or the groupcast sidelink message.

In some examples, the determined resource is a preconfigured resource for the broadcast sidelink message or the groupcast sidelink message.

In some examples, the conflict between sidelink transmissions includes a time overlap of the one or more sidelink resources, a frequency overlap of the one or more sidelink resources, or both.

In some examples, to support transmitting the message including the indication of the conflict, the communication component 1040 may be configured as or otherwise support a means for transmitting the message including the indication of the conflict after the conflict has occurred, where the indication of the conflict indicates retransmission of a sidelink transmission by the second UE.

In some examples, to support transmitting the message including the indication of the conflict, the communication component 1040 may be configured as or otherwise support a means for transmitting the message including the indication of the conflict prior to the conflict occurring, where the indication of the conflict indicates the second UE to refrain from transmitting a sidelink transmission.

Additionally or alternatively, the communications manager 1020 may support wireless communication at a first UE in accordance with examples as disclosed herein. In some examples, the conflict component 1025 may be configured as or otherwise support a means for receiving, from a second UE, a message that indicates a conflict between sidelink messages in one or more sidelink resources of a set of sidelink resources reserved for communications by the first UE. In some examples, the measurement component 1030 may be configured as or otherwise support a means for measuring a system load of a sidelink channel for the sidelink messages based on receiving the message. In some examples, the threshold component 1035 may optionally be configured as or otherwise support a means for determining a threshold system load of the sidelink channel based on a priority of a sidelink message of the sidelink messages, the sidelink message associated with the first UE. In some examples, the communication component 1040 may be configured as or otherwise support a means for transmitting the sidelink message based on the system load satisfying the threshold system load.

In some examples, the threshold component 1035 may be configured as or otherwise support a means for selecting the threshold system load from a set of threshold system loads based on the priority of the sidelink message.

In some examples, the set of threshold system loads is configured or pre-configured for the first UE, and each of the set of threshold system loads corresponds to a respective priority of a set of priorities for sidelink communications.

In some examples, the conflict component 1025 may be configured as or otherwise support a means for receiving, from the second UE, a second message that indicates a second conflict between second sidelink messages in one or more sidelink resources of a second set of sidelink resources reserved for communications by the first UE. In some examples, the measurement component 1030 may be configured as or otherwise support a means for measuring a second system load of the sidelink channel for the second sidelink messages based on receiving the second message. In some examples, the threshold component 1035 may be configured as or otherwise support a means for determining a second threshold system load of the sidelink channel based on a second priority of a second sidelink message of the second sidelink messages, the second sidelink message associated with the first UE. In some examples, the communication component 1040 may be configured as or otherwise support a means for refraining from transmitting the second sidelink message based on the second system load failing to satisfy the second threshold system load.

In some examples, to support measuring the system load of the sidelink channel, the measurement component 1030 may be configured as or otherwise support a means for measuring a CR associated with the sidelink channel, a CBR associated with the sidelink channel, or both.

In some examples, the conflict between sidelink transmissions includes a time overlap of the one or more sidelink resources, a frequency overlap of the one or more sidelink resources, or both.

In some examples, to support receiving the message that indicates the conflict, the conflict component 1025 may be configured as or otherwise support a means for receiving the message that indicates the conflict after the conflict has occurred, where the message indicates retransmission of the sidelink message by the first UE, and where transmitting the sidelink message is based on the message indicating retransmission of the sidelink message by the first UE.

In some examples, to support receiving the message that indicates the conflict, the conflict component 1025 may be configured as or otherwise support a means for receiving the message that indicates the conflict prior to the conflict occurring, where the message indicates the second UE to refrain from transmitting the sidelink message.

Figure 11:
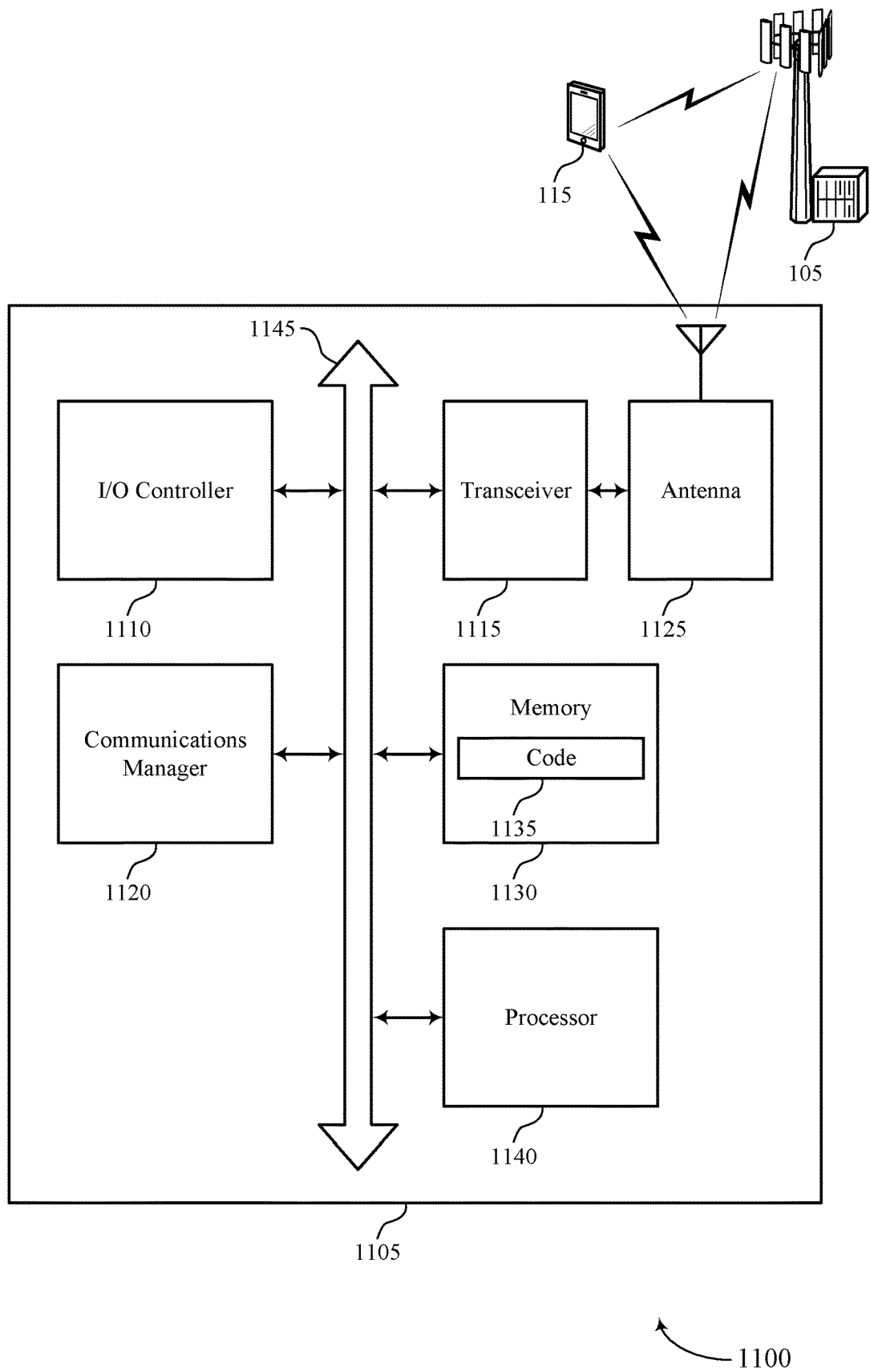
FIG. 11 shows a diagram of a system including a device that supports sidelink conflict indication in accordance with aspects of the present disclosure.

FIG. 11 shows a diagram of a system 1100 including a device 1105 that supports sidelink conflict indication in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting sidelink conflict indication). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for identifying a conflict between sidelink transmissions in one or more sidelink resources of a set of sidelink resources reserved for communications by a second UE. The communications manager 1120 may be configured as or otherwise support a means for measuring a system load of a sidelink channel for the sidelink transmissions based on identifying the conflict. The communications manager 1120 may be configured as or otherwise support a means for determining a threshold system load of the sidelink channel. In some examples, the communications manager 1120 may optionally be configured as or otherwise support a means for determining a threshold system load of the sidelink channel based at least in part on one or more priorities associated with the sidelink transmissions. The communications manager 1120 may be configured as or otherwise support a means for transmitting a message including an indication of the conflict based on the system load satisfying the threshold system load.

Additionally or alternatively, the communications manager 1120 may support wireless communication at a first UE in accordance with examples as disclosed herein. For example, the communications manager 1120 may be configured as or otherwise support a means for decoding SCI from a second UE that indicates a set of sidelink resources reserved for communications by the second UE, the SCI associated with a broadcast sidelink message or a groupcast sidelink message. The communications manager 1120 may be configured as or otherwise support a means for identifying, based on the SCI, a conflict between sidelink messages in one or more sidelink resources of the set of sidelink resources. The communications manager 1120 may be configured as or otherwise support a means for determining a resource of a sidelink feedback channel for transmission of an indication of the conflict based on whether the SCI is associated with the broadcast sidelink message or the groupcast sidelink message. The communications manager 1120 may be configured as or otherwise support a means for transmitting a message including the indication of the conflict using the sidelink feedback channel and the determined resource.

Additionally or alternatively, the communications manager 1120 may support wireless communication at a first UE in accordance with examples as disclosed herein. For example, the communications manager 1120 may be configured as or otherwise support a means for receiving, from a second UE, a message that indicates a conflict between sidelink messages in one or more sidelink resources of a set of sidelink resources reserved for communications by the first UE. The communications manager 1120 may be configured as or otherwise support a means for measuring a system load of a sidelink channel for the sidelink messages based on receiving the message. The communications manager 1120 may optionally be configured as or otherwise support a means for determining a threshold system load of the sidelink channel based on a priority of a sidelink message of the sidelink messages, the sidelink message associated with the first UE. The communications manager 1120 may be configured as or otherwise support a means for transmitting the sidelink message based on the system load satisfying the threshold system load.

By including or configuring the communications manager 1120 in accordance with examples as described herein, the device 1105 may reduce channel congestion and system load and increase reliability and resource utilization efficiency associated with transmitting sidelink messages. For example, transmitting sidelink conflict indications and sidelink messages based on system load and transmitting sidelink conflict indications according to cast type may reduce channel congestion and system load and increase reliability and resource utilization efficiency associated with transmitting sidelink messages. Additionally, transmitting sidelink conflict indications and sidelink messages based on system load and transmitting sidelink conflict indications according to cast type may promote improvements to efficiency and resource usage of transmitting sidelink messages and, in some examples, may promote spectral efficiency, reduce power consumption, improve coordination between UEs, and increase battery life, among other benefits.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of sidelink conflict indication as described herein, or the processor 1140 and the memory 1130 may be otherwise configured to perform or support such operations.

Figure 12:
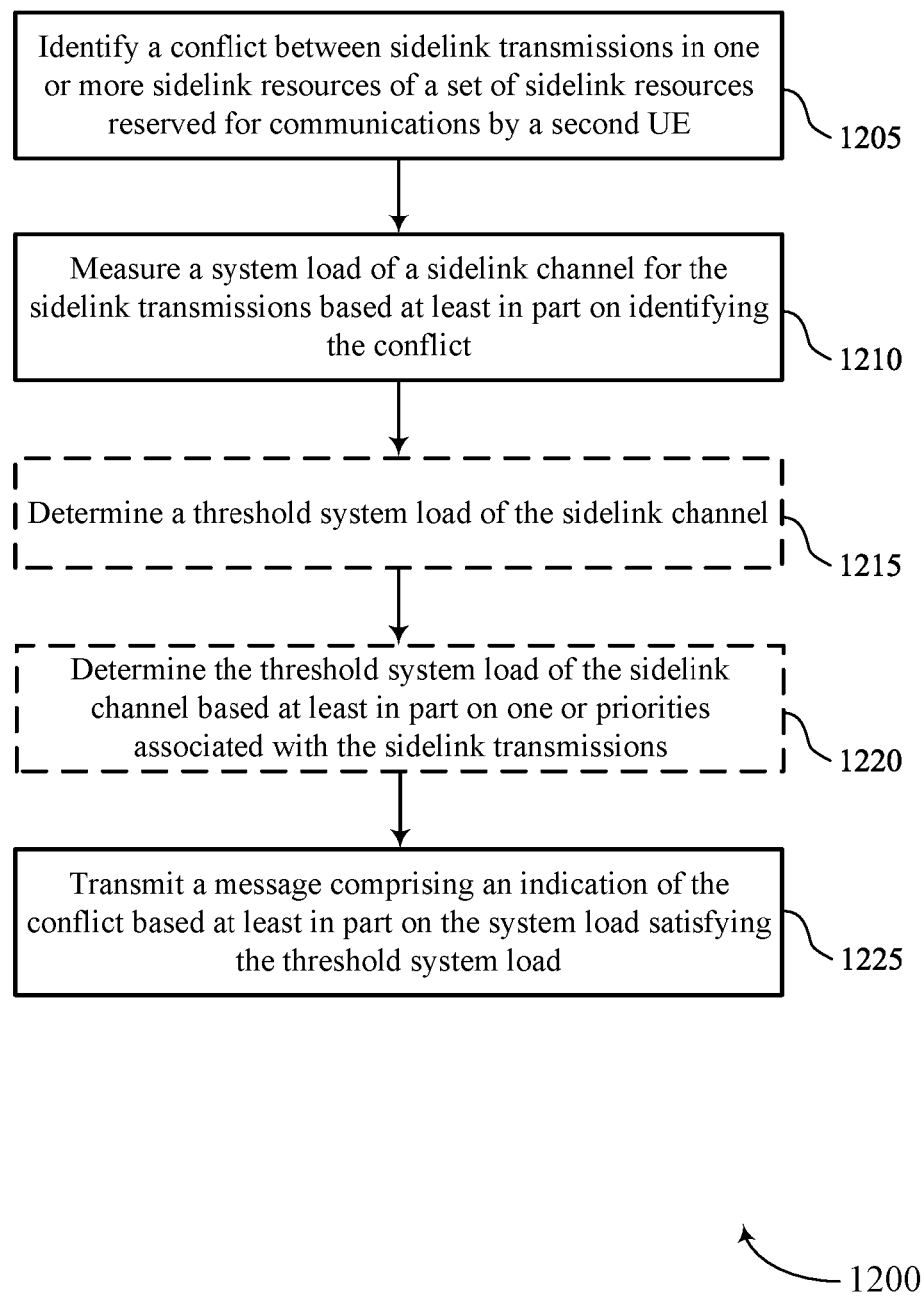
FIGS. 12 through 19 show flowcharts illustrating methods that support sidelink conflict indication in accordance with aspects of the present disclosure.

FIG. 12 shows a flowchart illustrating a method 1200 that supports sidelink conflict indication in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include identifying a conflict between sidelink transmissions in one or more sidelink resources of a set of sidelink resources reserved for communications by a second UE. The operations of 1205 may be performed in accordance with examples as disclosed herein. In some examples, aspects of the operations of 1205 may be performed by a conflict component 1025 as described with reference to FIG. 10.

At 1210, the method may include measuring a system load of a sidelink channel for the sidelink transmissions based on identifying the conflict. The operations of 1210 may be performed in accordance with examples as disclosed herein. In some examples, aspects of the operations of 1210 may be performed by a measurement component 1030 as described with reference to FIG. 10.

At 1215, the method may optionally include determining a threshold system load of the sidelink channel. The operations of 1215 may be performed in accordance with examples as disclosed herein. In some examples, aspects of the operations of 1215 may be performed by a threshold component 1035 as described with reference to FIG. 10.

At 1220, the method may optionally include determining the threshold system load of the sidelink channel based on one or more priorities associated with the sidelink transmissions. The operations of 1220 may be performed in accordance with examples as disclosed herein. In some examples, aspects of the operations of 1220 may be performed by a threshold component 1035 as described with reference to FIG. 10.

At 1225, the method may include transmitting a message including an indication of the conflict based on the system load satisfying the threshold system load. The operations of 1225 may be performed in accordance with examples as disclosed herein. In some examples, aspects of the operations of 1225 may be performed by a communication component 1040 as described with reference to FIG. 10.

Figure 13:
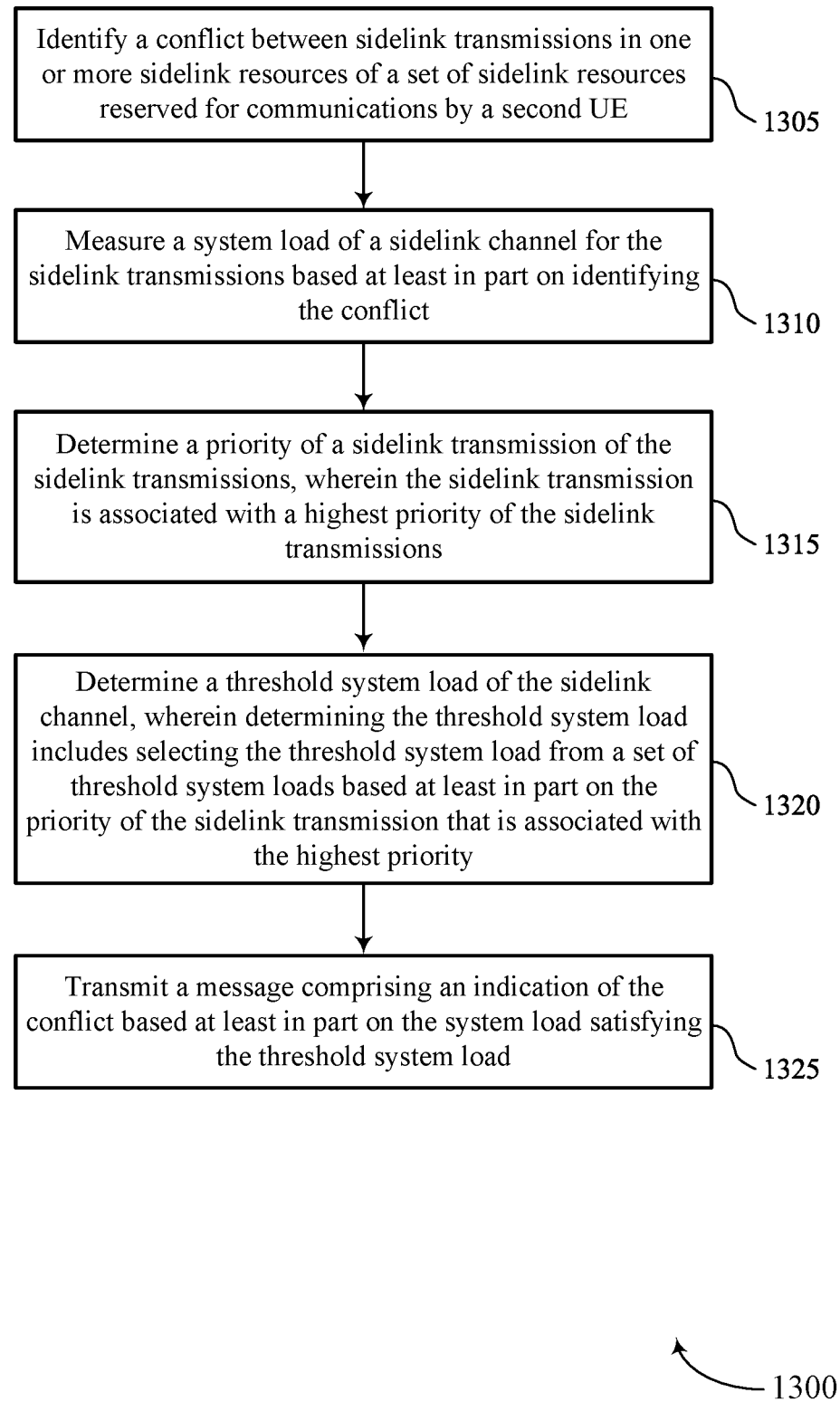

FIG. 13 shows a flowchart illustrating a method 1300 that supports sidelink conflict indication in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include identifying a conflict between sidelink transmissions in one or more sidelink resources of a set of sidelink resources reserved for communications by a second UE. The operations of 1305 may be performed in accordance with examples as disclosed herein. In some examples, aspects of the operations of 1305 may be performed by a conflict component 1025 as described with reference to FIG. 10.

At 1310, the method may include measuring a system load of a sidelink channel for the sidelink transmissions based on identifying the conflict. The operations of 1310 may be performed in accordance with examples as disclosed herein. In some examples, aspects of the operations of 1310 may be performed by a measurement component 1030 as described with reference to FIG. 10.

At 1315, the method may include determining a priority of a sidelink transmission of the sidelink transmissions, where the sidelink transmission is associated with a highest priority of the sidelink transmissions. The operations of 1315 may be performed in accordance with examples as disclosed herein. In some examples, aspects of the operations of 1315 may be performed by a priority component 1055 as described with reference to FIG. 10.

At 1320, the method may include determining a threshold system load of the sidelink channel, where determining the threshold system load includes selecting the threshold system load from a set of threshold system loads based on the priority of the sidelink transmission that is associated with the highest priority. The operations of 1320 may be performed in accordance with examples as disclosed herein. In some examples, aspects of the operations of 1320 may be performed by a threshold component 1035 as described with reference to FIG. 10.

At 1325, the method may include transmitting a message including an indication of the conflict based on the system load satisfying the threshold system load. The operations of 1325 may be performed in accordance with examples as disclosed herein. In some examples, aspects of the operations of 1325 may be performed by a communication component 1040 as described with reference to FIG. 10.

Figure 14:
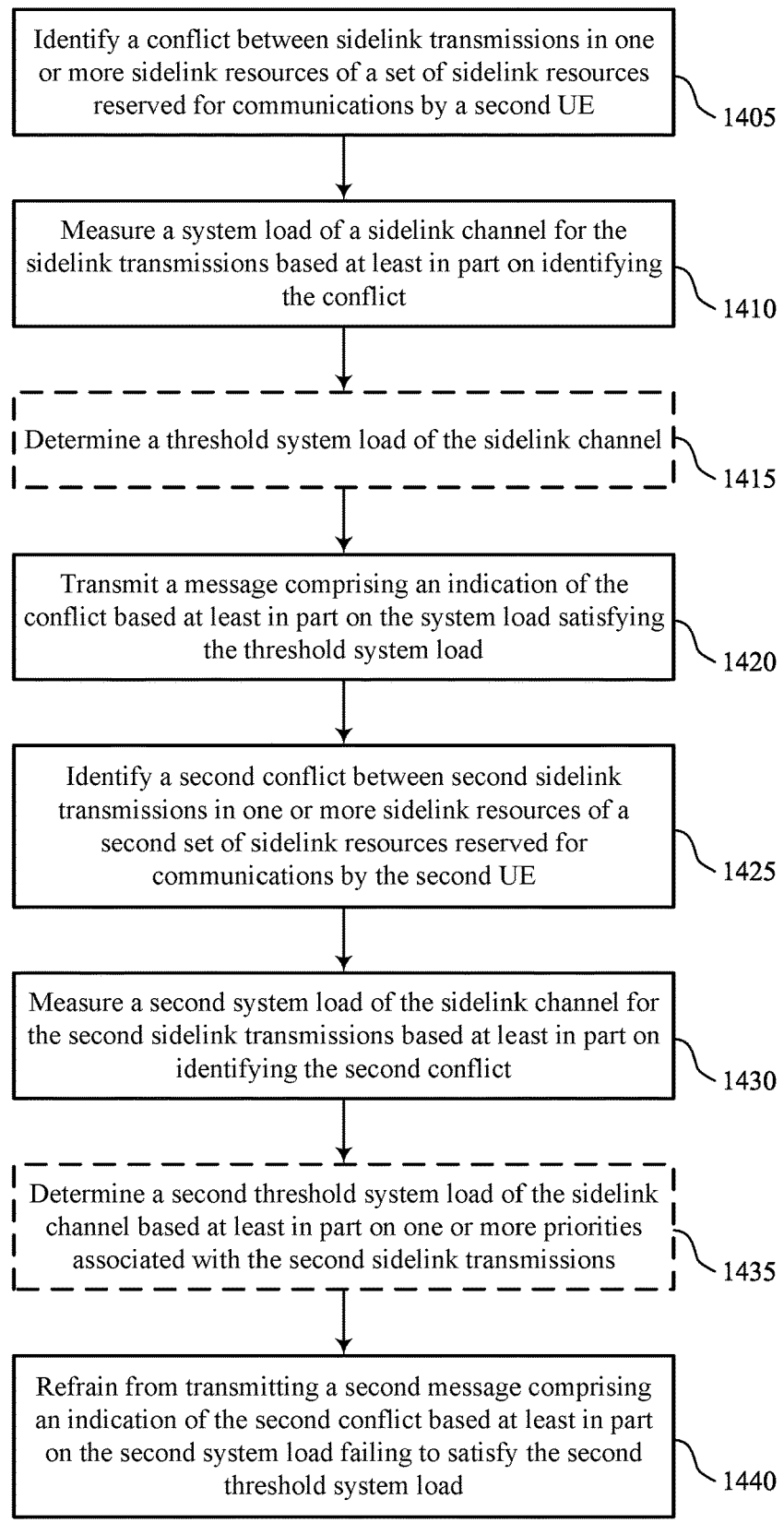

FIG. 14 shows a flowchart illustrating a method 1400 that supports sidelink conflict indication in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include identifying a conflict between sidelink transmissions in one or more sidelink resources of a set of sidelink resources reserved for communications by a second UE. The operations of 1405 may be performed in accordance with examples as disclosed herein. In some examples, aspects of the operations of 1405 may be performed by a conflict component 1025 as described with reference to FIG. 10.

At 1410, the method may include measuring a system load of a sidelink channel for the sidelink transmissions based on identifying the conflict. The operations of 1410 may be performed in accordance with examples as disclosed herein. In some examples, aspects of the operations of 1410 may be performed by a measurement component 1030 as described with reference to FIG. 10.

At 1415, the method may optionally include determining a threshold system load of the sidelink channel. The operations of 1415 may be performed in accordance with examples as disclosed herein. In some examples, aspects of the operations of 1415 may be performed by a threshold component 1035 as described with reference to FIG. 10.

At 1420, the method may include transmitting a message including an indication of the conflict based on the system load satisfying the threshold system load. The operations of 1420 may be performed in accordance with examples as disclosed herein. In some examples, aspects of the operations of 1420 may be performed by a communication component 1040 as described with reference to FIG. 10.

At 1425, the method may include identifying a second conflict between second sidelink transmissions in one or more sidelink resources of a second set of sidelink resources reserved for communications by the second UE. The operations of 1425 may be performed in accordance with examples as disclosed herein. In some examples, aspects of the operations of 1425 may be performed by a conflict component 1025 as described with reference to FIG. 10.

At 1430, the method may include measuring a second system load of the sidelink channel for the second sidelink transmissions based on identifying the second conflict. The operations of 1430 may be performed in accordance with examples as disclosed herein. In some examples, aspects of the operations of 1430 may be performed by a measurement component 1030 as described with reference to FIG. 10.

At 1435, the method may optionally include determining a second threshold system load of the sidelink channel based on one or more priorities associated with the second sidelink transmissions. The operations of 1435 may be performed in accordance with examples as disclosed herein. In some examples, aspects of the operations of 1435 may be performed by a threshold component 1035 as described with reference to FIG. 10.

At 1440, the method may include refraining from transmitting a second message including an indication of the second conflict based on the second system load failing to satisfy the second threshold system load. The operations of 1440 may be performed in accordance with examples as disclosed herein. In some examples, aspects of the operations of 1440 may be performed by a communication component 1040 as described with reference to FIG. 10.

Figure 15:
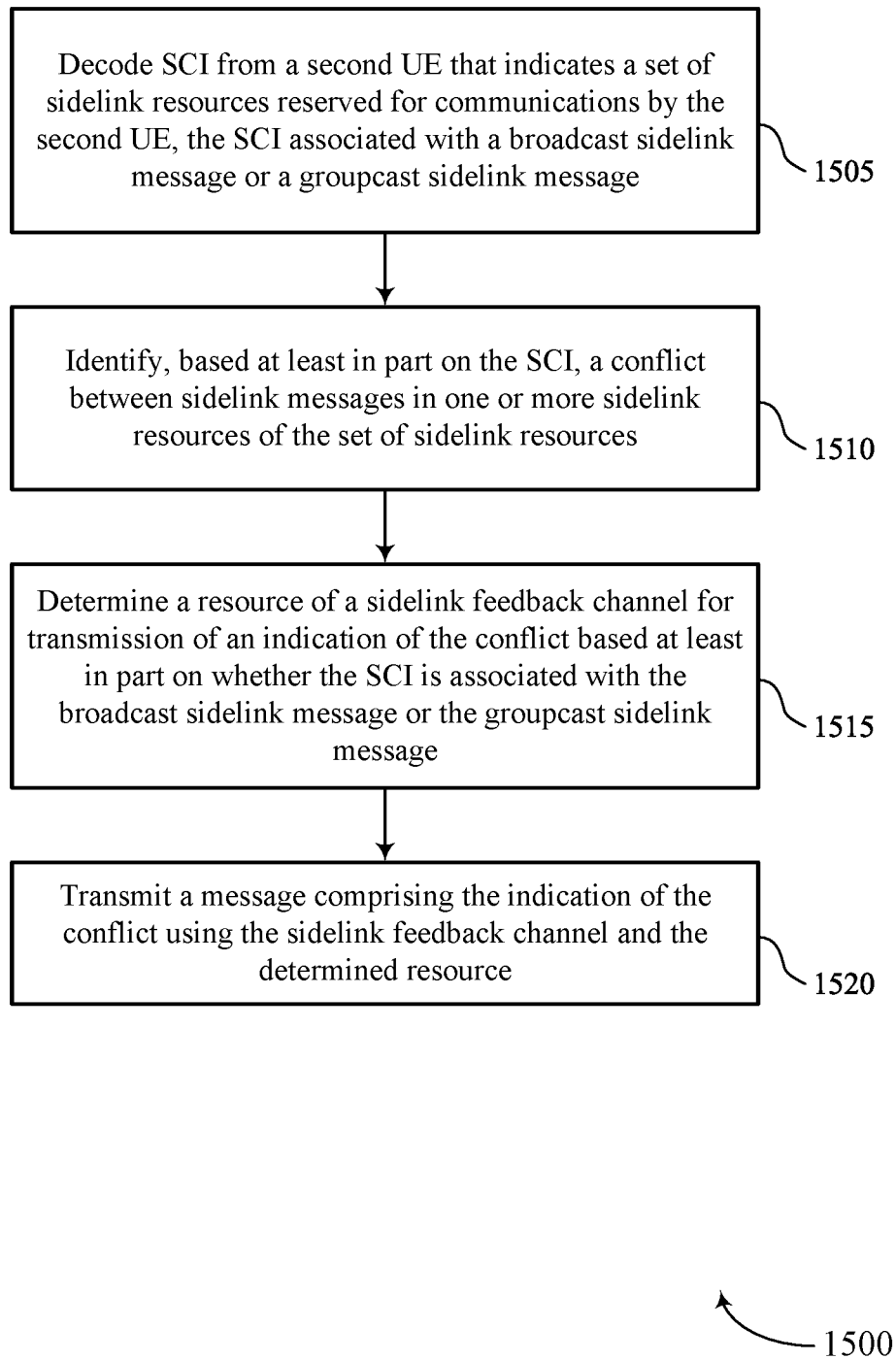

FIG. 15 shows a flowchart illustrating a method 1500 that supports sidelink conflict indication in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include decoding SCI from a second UE that indicates a set of sidelink resources reserved for communications by the second UE, the SCI associated with a broadcast sidelink message or a groupcast sidelink message. The operations of 1505 may be performed in accordance with examples as disclosed herein. In some examples, aspects of the operations of 1505 may be performed by an SCI component 1045 as described with reference to FIG. 10.

At 1510, the method may include identifying, based on the SCI, a conflict between sidelink messages in one or more sidelink resources of the set of sidelink resources. The operations of 1510 may be performed in accordance with examples as disclosed herein. In some examples, aspects of the operations of 1510 may be performed by a conflict component 1025 as described with reference to FIG. 10.

At 1515, the method may include determining a resource of a sidelink feedback channel for transmission of an indication of the conflict based on whether the SCI is associated with the broadcast sidelink message or the groupcast sidelink message. The operations of 1515 may be performed in accordance with examples as disclosed herein. In some examples, aspects of the operations of 1515 may be performed by a resource component 1050 as described with reference to FIG. 10.

At 1520, the method may include transmitting a message including the indication of the conflict using the sidelink feedback channel and the determined resource. The operations of 1520 may be performed in accordance with examples as disclosed herein. In some examples, aspects of the operations of 1520 may be performed by a communication component 1040 as described with reference to FIG. 10.

Figure 16:
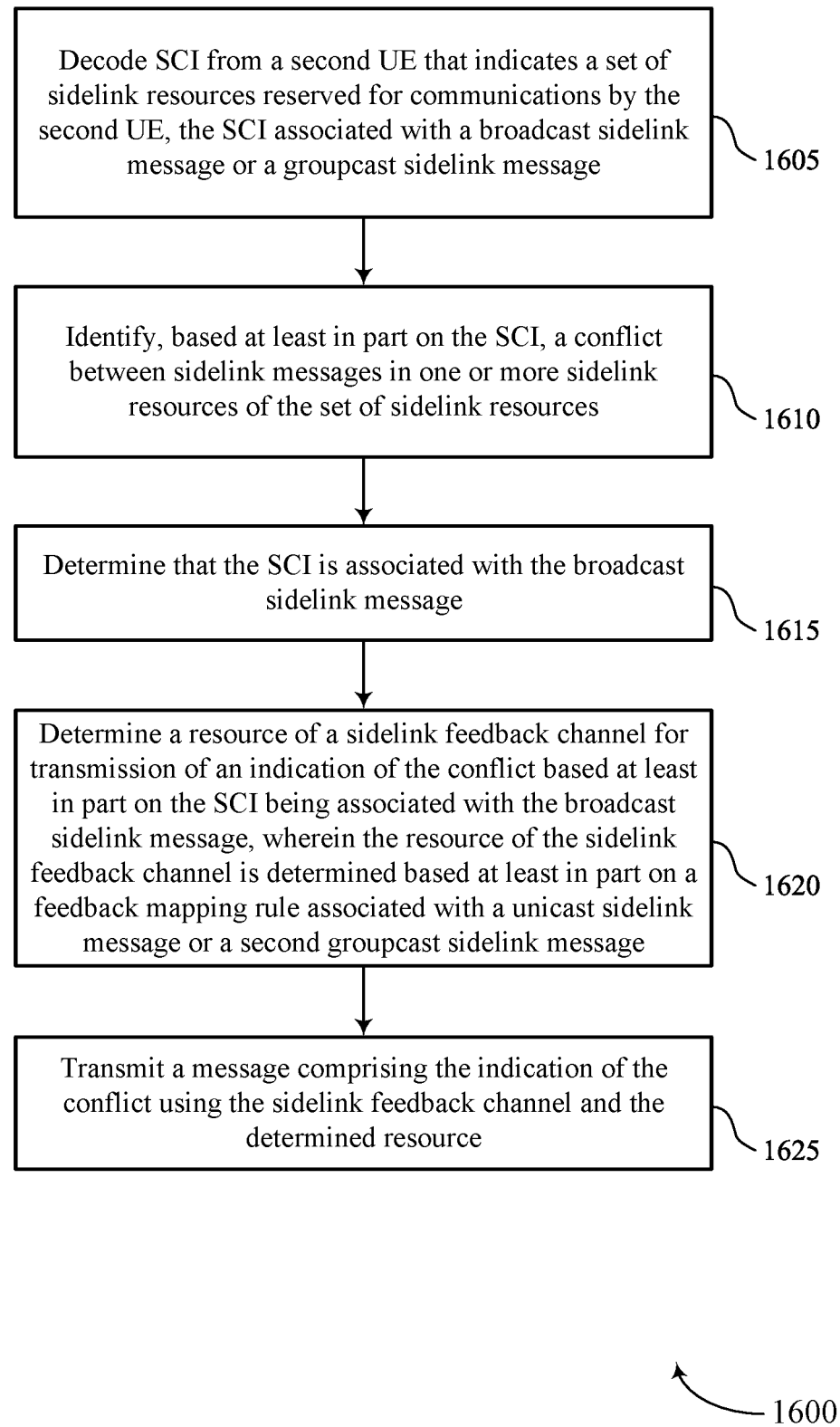

FIG. 16 shows a flowchart illustrating a method 1600 that supports sidelink conflict indication in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include decoding SCI from a second UE that indicates a set of sidelink resources reserved for communications by the second UE, the SCI associated with a broadcast sidelink message or a groupcast sidelink message. The operations of 1605 may be performed in accordance with examples as disclosed herein. In some examples, aspects of the operations of 1605 may be performed by an SCI component 1045 as described with reference to FIG. 10.

At 1610, the method may include identifying, based on the SCI, a conflict between sidelink messages in one or more sidelink resources of the set of sidelink resources. The operations of 1610 may be performed in accordance with examples as disclosed herein. In some examples, aspects of the operations of 1610 may be performed by a conflict component 1025 as described with reference to FIG. 10.

At 1615, the method may include determining that the SCI is associated with the broadcast sidelink message. The operations of 1615 may be performed in accordance with examples as disclosed herein. In some examples, aspects of the operations of 1615 may be performed by an SCI component 1045 as described with reference to FIG. 10.

At 1620, the method may include determining a resource of a sidelink feedback channel for transmission of an indication of the conflict based on the SCI being associated with the broadcast sidelink message, where the resource of the sidelink feedback channel is determined based on a feedback mapping rule associated with a unicast sidelink message or a second groupcast sidelink message. The operations of 1620 may be performed in accordance with examples as disclosed herein. In some examples, aspects of the operations of 1620 may be performed by a resource component 1050 as described with reference to FIG. 10.

At 1625, the method may include transmitting a message including the indication of the conflict using the sidelink feedback channel and the determined resource. The operations of 1625 may be performed in accordance with examples as disclosed herein. In some examples, aspects of the operations of 1625 may be performed by a communication component 1040 as described with reference to FIG. 10.

Figure 17:
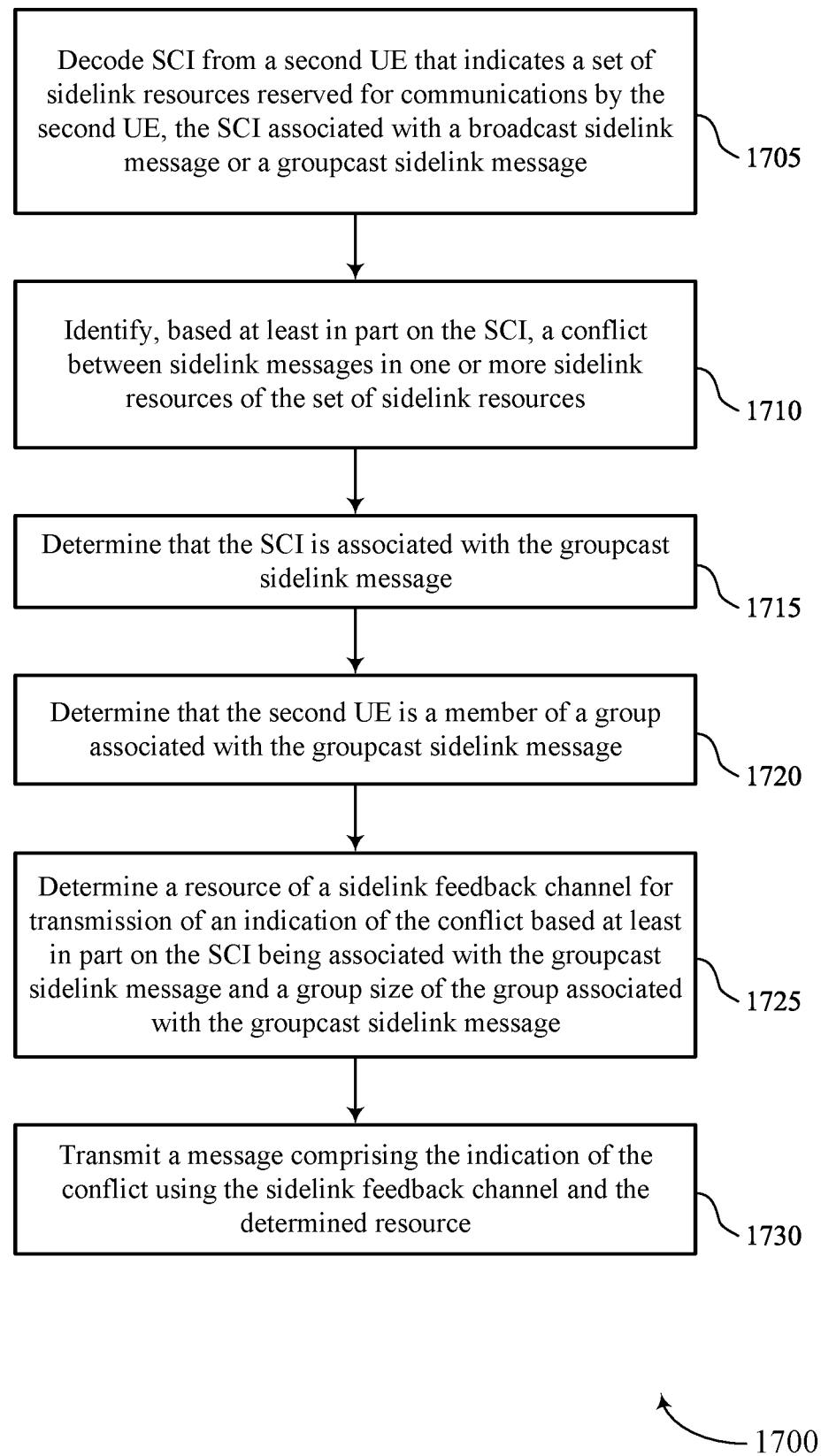

FIG. 17 shows a flowchart illustrating a method 1700 that supports sidelink conflict indication in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include decoding SCI from a second UE that indicates a set of sidelink resources reserved for communications by the second UE, the SCI associated with a broadcast sidelink message or a groupcast sidelink message. The operations of 1705 may be performed in accordance with examples as disclosed herein. In some examples, aspects of the operations of 1705 may be performed by an SCI component 1045 as described with reference to FIG. 10.

At 1710, the method may include identifying, based on the SCI, a conflict between sidelink messages in one or more sidelink resources of the set of sidelink resources. The operations of 1710 may be performed in accordance with examples as disclosed herein. In some examples, aspects of the operations of 1710 may be performed by a conflict component 1025 as described with reference to FIG. 10.

At 1715, the method may include determining that the SCI is associated with the groupcast sidelink message. The operations of 1715 may be performed in accordance with examples as disclosed herein. In some examples, aspects of the operations of 1715 may be performed by an SCI component 1045 as described with reference to FIG. 10.

At 1720, the method may include determining that the second UE is a member of a group associated with the groupcast sidelink message. The operations of 1720 may be performed in accordance with examples as disclosed herein.

In some examples, aspects of the operations of 1720 may be performed by a group component 1060 as described with reference to FIG. 10.

At 1725, the method may include determining a resource of a sidelink feedback channel for transmission of an indication of the conflict based on the SCI being associated with the groupcast sidelink message and a group size of the group associated with the groupcast sidelink message. The operations of 1725 may be performed in accordance with examples as disclosed herein. In some examples, aspects of the operations of 1725 may be performed by a resource component 1050 as described with reference to FIG. 10.

At 1730, the method may include transmitting a message including the indication of the conflict using the sidelink feedback channel and the determined resource. The operations of 1730 may be performed in accordance with examples as disclosed herein. In some examples, aspects of the operations of 1730 may be performed by a communication component 1040 as described with reference to FIG. 10.

Figure 18:
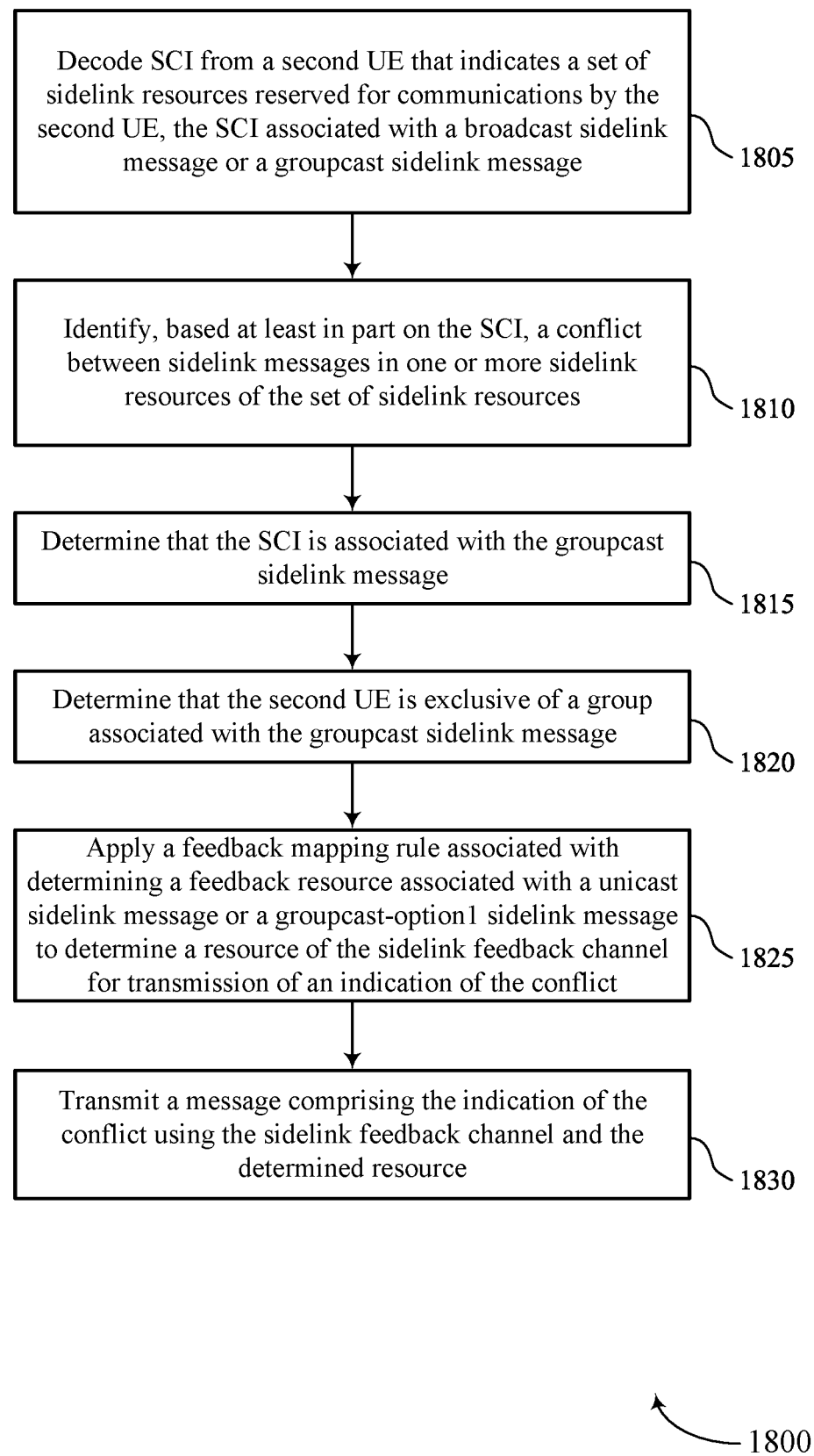

FIG. 18 shows a flowchart illustrating a method 1800 that supports sidelink conflict indication in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include decoding SCI from a second UE that indicates a set of sidelink resources reserved for communications by the second UE, the SCI associated with a broadcast sidelink message or a groupcast sidelink message. The operations of 1805 may be performed in accordance with examples as disclosed herein. In some examples, aspects of the operations of 1805 may be performed by an SCI component 1045 as described with reference to FIG. 10.

At 1810, the method may include identifying, based on the SCI, a conflict between sidelink messages in one or more sidelink resources of the set of sidelink resources. The operations of 1810 may be performed in accordance with examples as disclosed herein. In some examples, aspects of the operations of 1810 may be performed by a conflict component 1025 as described with reference to FIG. 10.

At 1815, the method may include determining that the SCI is associated with the groupcast sidelink message. The operations of 1815 may be performed in accordance with examples as disclosed herein. In some examples, aspects of the operations of 1815 may be performed by an SCI component 1045 as described with reference to FIG. 10.

At 1820, the method may include determining that the second UE is exclusive of a group associated with the groupcast sidelink message. The operations of 1820 may be performed in accordance with examples as disclosed herein. In some examples, aspects of the operations of 1820 may be performed by a group component 1060 as described with reference to FIG. 10.

At 1825, the method may include applying a feedback mapping rule associated with determining a feedback resource associated with a unicast sidelink message or a groupcast-option1 sidelink message to determine a resource of the sidelink feedback channel for transmission of an indication of the conflict. The operations of 1825 may be performed in accordance with examples as disclosed herein. In some examples, aspects of the operations of 1825 may be performed by a resource component 1050 as described with reference to FIG. 10.

At 1835, the method may include transmitting a message including the indication of the conflict using the sidelink feedback channel and the determined resource. The operations of 1835 may be performed in accordance with examples as disclosed herein. In some examples, aspects of the operations of 1835 may be performed by a communication component 1040 as described with reference to FIG. 10.

Figure 19:
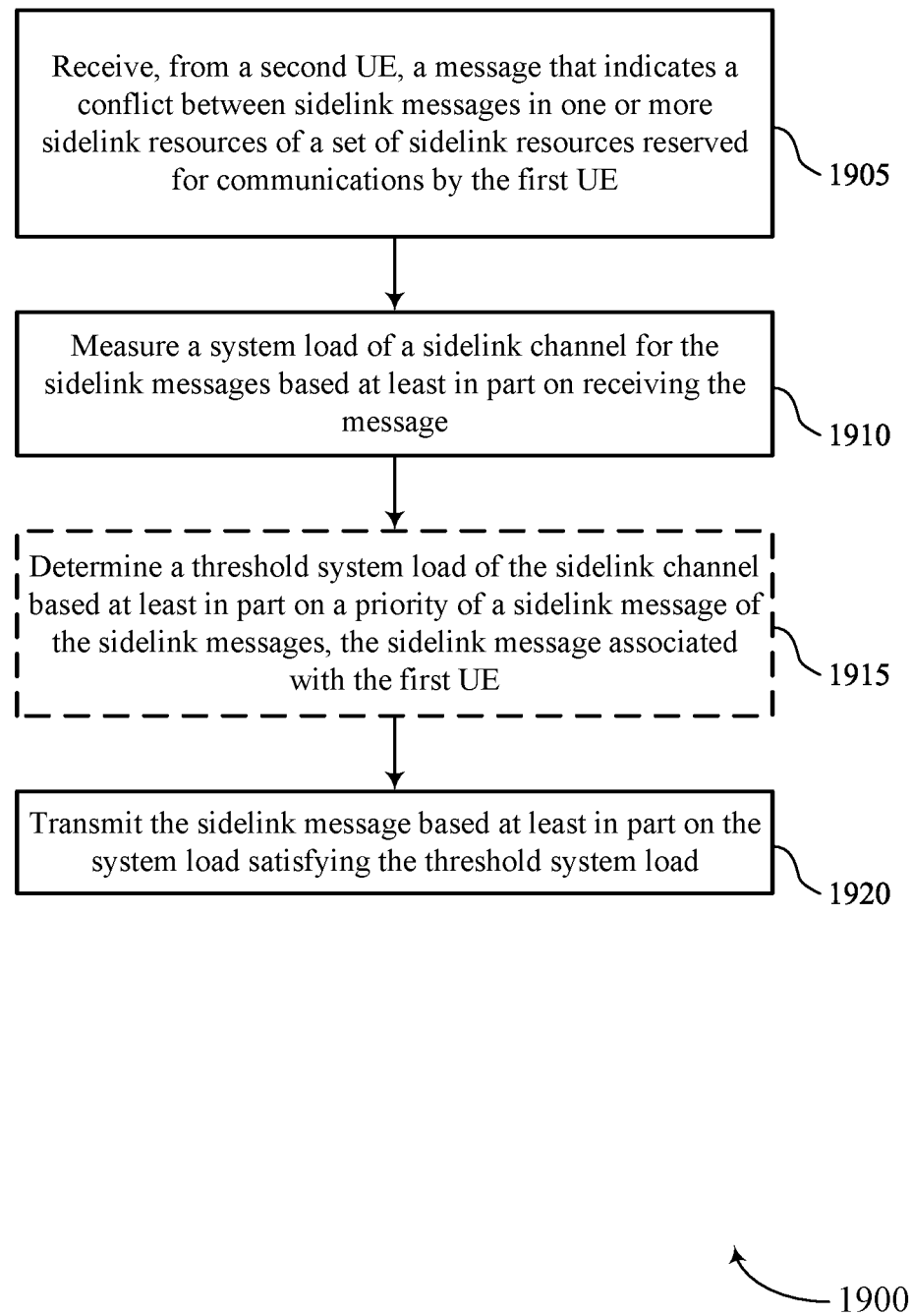

FIG. 19 shows a flowchart illustrating a method 1900 that supports sidelink conflict indication in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a second UE, a message that indicates a conflict between sidelink messages in one or more sidelink resources of a set of sidelink resources reserved for communications by the first UE. The operations of 1905 may be performed in accordance with examples as disclosed herein. In some examples, aspects of the operations of 1905 may be performed by a conflict component 1025 as described with reference to FIG. 10.

At 1910, the method may include measuring a system load of a sidelink channel for the sidelink messages based on receiving the message. The operations of 1910 may be performed in accordance with examples as disclosed herein. In some examples, aspects of the operations of 1910 may be performed by a measurement component 1030 as described with reference to FIG. 10.

At 1915, the method may optionally include determining a threshold system load of the sidelink channel based on a priority of a sidelink message of the sidelink messages, the sidelink message associated with the first UE. The operations of 1915 may be performed in accordance with examples as disclosed herein. In some examples, aspects of the operations of 1915 may be performed by a threshold component 1035 as described with reference to FIG. 10.

At 1920, the method may include transmitting the sidelink message based on the system load satisfying the threshold system load. The operations of 1920 may be performed in accordance with examples as disclosed herein. In some examples, aspects of the operations of 1920 may be performed by a communication component 1040 as described with reference to FIG. 10.

The following provides an overview of aspects of the present disclosure:

Aspect 1: A method for wireless communication at a first UE, comprising: identifying a conflict between sidelink transmissions in one or more sidelink resources of a set of sidelink resources reserved for communications by a second UE; measuring a system load of a sidelink channel for the sidelink transmissions based at least in part on identifying the conflict; and transmitting a message comprising an indication of the conflict based at least in part on the system load satisfying a threshold system load of the sidelink channel.

Aspect 2: The method of aspect 1, further comprising: determining the threshold system load of the sidelink channel based at least in part on one or more priorities associated with the sidelink transmissions.

Aspect 3: The method of aspect 2, further comprising: determining a priority of a sidelink transmission of the sidelink transmissions, wherein the sidelink transmission is associated with a highest priority of the sidelink transmissions; and selecting the threshold system load from a set of threshold system loads based at least in part on the priority of the sidelink transmission that is associated with the highest priority.

Aspect 4: The method of aspect 3, wherein the set of threshold system loads is configured or pre-configured for the first UE, and each of the set of threshold system loads corresponds to a respective priority of a set of priorities for sidelink communications.

Aspect 5: The method of any of aspects 1 through 4, further comprising: identifying a second conflict between second sidelink transmissions in one or more sidelink resources of a second set of sidelink resources reserved for communications by the second UE; measuring a second system load of the sidelink channel for the second sidelink transmissions based at least in part on identifying the second conflict; and refraining from transmitting a second message comprising an indication of the second conflict based at least in part on the second system load failing to satisfy a second threshold system load of the sidelink channel, the second threshold system load based at least in part on one or more priorities associated with the second sidelink transmissions.

Aspect 6: The method of any of aspects 1 through 5, wherein measuring the system load of the sidelink channel comprises: measuring a CR associated with the sidelink channel, a CBR associated with the sidelink channel, or both.

Aspect 7: The method of any of aspects 1 through 6, wherein the conflict between sidelink transmissions comprises a time overlap of the one or more sidelink resources, a frequency overlap of the one or more sidelink resources, or both.

Aspect 8: The method of any of aspects 1 through 7, wherein transmitting the message comprising the indication of the conflict comprises: transmitting the message comprising the indication of the conflict after the conflict has occurred, wherein the indication of the conflict indicates retransmission of a sidelink transmission by the second UE.

Aspect 9: The method of any of aspects 1 through 7, wherein transmitting the message comprising the indication of the conflict comprises: transmitting the message comprising the indication of the conflict prior to the conflict occurring, wherein the indication of the conflict indicates the second UE to refrain from transmitting a sidelink transmission.

Aspect 10: A method for wireless communication at a first UE, comprising: decoding SCI from a second UE that indicates a set of sidelink resources reserved for communications by the second UE, the SCI associated with a broadcast sidelink message or a groupcast sidelink message; identifying, based at least in part on the SCI, a conflict between sidelink messages in one or more sidelink resources of the set of sidelink resources; determining a resource of a sidelink feedback channel for transmission of an indication of the conflict based at least in part on whether the SCI is associated with the broadcast sidelink message or the groupcast sidelink message; and transmitting a message comprising the indication of the conflict using the sidelink feedback channel and the determined resource.

Aspect 11: The method of aspect 10, further comprising: determining that the SCI is associated with the broadcast sidelink message, wherein the resource of the sidelink feedback channel is determined based at least in part on a feedback mapping rule associated with a unicast sidelink message or a second groupcast sidelink message.

Aspect 12: The method of aspect 10, further comprising: determining that the SCI is associated with the groupcast sidelink message; and determining that the second UE is a member of a group associated with the groupcast sidelink message, wherein the resource of the sidelink feedback channel is determined based at least in part on a group size of the group associated with the groupcast sidelink message.

Aspect 13: The method of aspect 10, further comprising: determining that the SCI is associated with the groupcast sidelink message; determining that the second UE is exclusive of a group associated with the groupcast sidelink message; and applying a feedback mapping rule associated with determining a feedback resource associated with a unicast sidelink message or a groupcast-option1 sidelink message to determine the resource of the sidelink feedback channel.

Aspect 14: The method of any of aspects 10 through 13, wherein the determined resource is a configured resource for the broadcast sidelink message or the groupcast sidelink message.

Aspect 15: The method of any of aspects 10 through 13, wherein the determined resource is a pre-configured resource for the broadcast sidelink message or the groupcast sidelink message.

Aspect 16: The method of any of aspects 10 through 15, wherein the conflict between sidelink transmissions comprises a time overlap of the one or more sidelink resources, a frequency overlap of the one or more sidelink resources, or both.

Aspect 17: The method of any of aspects 10 through 16, wherein transmitting the message comprising the indication of the conflict comprises: transmitting the message comprising the indication of the conflict after the conflict has occurred, wherein the indication of the conflict indicates retransmission of a sidelink transmission by the second UE.

Aspect 18: The method of any of aspects 10 through 16, wherein transmitting the message comprising the indication of the conflict comprises: transmitting the message comprising the indication of the conflict prior to the conflict occurring, wherein the indication of the conflict indicates the second UE to refrain from transmitting a sidelink transmission.

Aspect 19: A method for wireless communication at a first UE, comprising: receiving, from a second UE, a message that indicates a conflict between sidelink messages in one or more sidelink resources of a set of sidelink resources reserved for communications by the first UE; measuring a system load of a sidelink channel for the sidelink messages based at least in part on receiving the message; and transmitting a sidelink message of the sidelink messages based at least in part on the system load satisfying a threshold system load of the sidelink channel, wherein the threshold system load of the sidelink is based at least in part on a priority of the sidelink message, and wherein the sidelink message is associated with the first UE.

Aspect 20: The method of aspect 19, further comprising: selecting the threshold system load from a set of threshold system loads based at least in part on the priority of the sidelink message.

Aspect 21: The method of aspect 20, wherein the set of threshold system loads is configured or pre-configured for the first UE, and each of the set of threshold system loads corresponds to a respective priority of a set of priorities for sidelink communications.

Aspect 22: The method of any of aspects 19 through 21, further comprising: receiving, from the second UE, a second message that indicates a second conflict between second sidelink messages in one or more sidelink resources of a second set of sidelink resources reserved for communications by the first UE; measuring a second system load of the sidelink channel for the second sidelink messages based at least in part on receiving the second message; and refraining from transmitting a second sidelink message of the second sidelink messages based at least in part on the second system load failing to satisfy a second threshold system load of the sidelink channel, wherein the second threshold system load is based at least in part on a second priority of the second sidelink message, and wherein the second sidelink message is associated with the first UE.

Aspect 23: The method of any of aspects 19 through 22, wherein measuring the system load of the sidelink channel comprises: measuring a CR associated with the sidelink channel, a CBR associated with the sidelink channel, or both.

Aspect 24: The method of any of aspects 19 through 23, wherein the conflict between sidelink transmissions comprises a time overlap of the one or more sidelink resources, a frequency overlap of the one or more sidelink resources, or both.

Aspect 25: The method of any of aspects 19 through 24, wherein receiving the message that indicates the conflict comprises: receiving the message that indicates the conflict after the conflict has occurred, wherein the message indicates retransmission of the sidelink message by the first UE, and wherein transmitting the sidelink message is based at least in part on the message indicating retransmission of the sidelink message by the first UE.

Aspect 26: The method of any of aspects 19 through 24, wherein receiving the message that indicates the conflict comprises: receiving the message that indicates the conflict prior to the conflict occurring, wherein the message indicates the second UE to refrain from transmitting the sidelink message.

Aspect 27: An apparatus for wireless communication at a first UE, comprising a processor; memory coupled with the processor; and instructions stored in the memory and executable by the processor to cause the apparatus to perform a method of any of aspects 1 through 9.

Aspect 28: An apparatus for wireless communication at a first UE, comprising at least one means for performing a method of any of aspects 1 through 9.

Aspect 29: A non-transitory computer-readable medium storing code for wireless communication at a first UE, the code comprising instructions executable by a processor to perform a method of any of aspects 1 through 9.

Aspect 30: An apparatus for wireless communication at a first UE, comprising a processor; memory coupled with the processor; and instructions stored in the memory and executable by the processor to cause the apparatus to perform a method of any of aspects 10 through 18.

Aspect 31: An apparatus for wireless communication at a first UE, comprising at least one means for performing a method of any of aspects 10 through 18.

Aspect 32: A non-transitory computer-readable medium storing code for wireless communication at a first UE, the code comprising instructions executable by a processor to perform a method of any of aspects 10 through 18.

Aspect 33: An apparatus for wireless communication at a first UE, comprising a processor; memory coupled with the processor; and instructions stored in the memory and executable by the processor to cause the apparatus to perform a method of any of aspects 19 through 26.

Aspect 34: An apparatus for wireless communication at a first UE, comprising at least one means for performing a method of any of aspects 19 through 26.

Aspect 35: A non-transitory computer-readable medium storing code for wireless communication at a first UE, the code comprising instructions executable by a processor to perform a method of any of aspects 19 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   receiving, from a second UE, sidelink control information that indicates one or more sidelink resources reserved for communication by the second UE;
   measuring a system load of a sidelink channel associated with the one or more sidelink resources based at least in part on a conflict between one or more sidelink transmissions in the one or more sidelink resources reserved for communication by the second UE and one or more other sidelink transmissions; and
   transmitting a message comprising an indication of the conflict based at least in part on the system load satisfying a threshold system load of the sidelink channel from a set of threshold system loads, wherein the threshold system load is associated with a priority of a sidelink transmission of the one or more sidelink transmissions or the one or more other sidelink transmissions, and wherein the sidelink transmission is associated with a highest priority of the one or more sidelink transmissions or the one or more other sidelink transmissions.

2. The method of claim 1, further comprising:
   determining the threshold system load of the sidelink channel based at least in part on one or more priorities associated with the one or more sidelink transmissions.

3. The method of claim 2, further comprising:
   selecting the threshold system load from the set of threshold system loads based at least in part on the priority of the sidelink transmission that is associated with the highest priority.

4. The method of claim 3, wherein the set of threshold system loads is configured or pre-configured for the first UE, and each of the set of threshold system loads corresponds to a respective priority of a set of priorities for sidelink communications.

5. The method of claim 1, further comprising:
   receiving, from the second UE, second sidelink control information that indicates one or more second sidelink resources reserved for communication by the second UE;
   measuring a second system load of the sidelink channel associated with the one or more second sidelink resources based at least in part on a second conflict between one or more second sidelink transmissions in the one or more second sidelink resources reserved for communication by the second UE and one or more second other sidelink transmissions; and
   refraining from transmitting a second message comprising an indication of the second conflict based at least in part on the second system load failing to satisfy a second threshold system load of the sidelink channel, the second threshold system load based at least in part on one or more priorities associated with the one or more second sidelink transmissions.

6. The method of claim 1, wherein measuring the system load of the sidelink channel comprises:
   measuring a channel occupancy ratio associated with the sidelink channel, a channel busy ratio associated with the sidelink channel, or both.

7. The method of claim 1, wherein the conflict between the one or more sidelink transmissions and the one or more other sidelink transmissions comprises a time overlap between the one or more sidelink resources and the one or more other sidelink transmissions, a frequency overlap between the one or more sidelink resources and the one or more other sidelink transmissions, or both.

8. The method of claim 1, wherein transmitting the message comprising the indication of the conflict comprises:
   transmitting the message comprising the indication of the conflict after the conflict has occurred, wherein the indication of the conflict indicates retransmission of the sidelink transmission by the second UE.

9. The method of claim 1, wherein transmitting the message comprising the indication of the conflict comprises:
   transmitting the message comprising the indication of the conflict prior to the conflict occurring, wherein the indication of the conflict indicates the second UE to refrain from transmitting the sidelink transmission.

10. An apparatus for wireless communication at a first user equipment (UE), comprising:
    at least one processor;
    memory coupled with the at least one processor; and
    one or more instructions stored in the memory and executable by the at least one processor to cause the apparatus to, based at least in part on the one or more instructions:
    receive, from a second UE, sidelink control information that indicates one or more sidelink resources reserved for communication by the second UE;
    measure a system load of a sidelink channel associated with the one or more sidelink resources based at least in part on a conflict between one or more sidelink transmissions in the one or more sidelink resources reserved for communication by the second UE and one or more other sidelink transmissions; and
    transmit a message comprising an indication of the conflict based at least in part on the system load satisfying a threshold system load of the sidelink channel from a set of threshold system loads, wherein the threshold system load is associated with a priority of a sidelink transmission of the one or more sidelink transmissions or the one or more other sidelink transmissions, and wherein the sidelink transmission is associated with a highest priority of the one or more sidelink transmissions or the one or more other sidelink transmissions.

11. The apparatus of claim 10, wherein the one or more instructions are further executable by the at least one processor to cause the apparatus to, based at least in part on the one or more instructions:
    determine the threshold system load of the sidelink channel based at least in part on one or more priorities associated with the one or more sidelink transmissions.

12. The apparatus of claim 11, wherein the one or more instructions are further executable by the at least one processor to cause the apparatus to, based at least in part on the one or more instructions:
    select the threshold system load from the set of threshold system loads based at least in part on the priority of the sidelink transmission that is associated with the highest priority.

13. The apparatus of claim 12, wherein the set of threshold system loads is configured or pre-configured for the first UE and each of the set of threshold system loads corresponds to a respective priority of a set of priorities for sidelink communications.

14. The apparatus of claim 10, wherein the instructions are further executable by the at least one processor to cause the apparatus to, based at least in part on the one or more instructions:
receive, from the second UE, second sidelink control information that indicates one or more second sidelink resources reserved for communication by the second UE;
measure a second system load of the sidelink channel associated with the one or more second sidelink resources based at least in part on a second conflict between one or more second sidelink transmissions in the one or more second sidelink resources reserved for communication by the second UE and one or more second other sidelink transmissions; and
refrain from transmitting a second message comprising an indication of the second conflict based at least in part on the second system load failing to satisfy a second threshold system load of the sidelink channel, the second threshold system load based at least in part on one or more priorities associated with the one or more second sidelink transmissions.

15. The apparatus of claim 10, wherein the one or more instructions to measure the system load of the sidelink channel are executable to cause the apparatus to, based at least in part on the one or more instructions:
measure a channel occupancy ratio associated with the sidelink channel, a channel busy ratio associated with the sidelink channel, or both.

16. The apparatus of claim 10, wherein the conflict between the one or more sidelink transmissions and the one or more other sidelink transmissions comprises a time overlap between the one or more sidelink resources and the one or more other sidelink transmissions, a frequency overlap between the one or more sidelink resources and the one or more other sidelink transmissions, or both.

17. The apparatus of claim 10, wherein the one or more instructions to transmit the message comprising the indication of the conflict are executable by the at least one processor to cause the apparatus to, based at least in part on the one or more instructions:
transmit the message comprising the indication of the conflict after the conflict after the conflict has occurred, wherein the indication of the conflict indicates retransmission of the sidelink transmission by the second UE.

18. The apparatus of claim 10, wherein the one or more instructions to transmit the message comprising the indication of the conflict are executable by the at least one processor to cause the apparatus to, based at least in part on the one or more instructions:
transmit the message comprising the indication of the conflict prior to the conflict occurring, wherein the indication of the conflict indicates the second UE to refrain from transmitting the sidelink transmission.

19. An apparatus for wireless communication at a first user equipment (UE), comprising:
means for receiving, from a second UE, sidelink control information that indicates one or more sidelink resources reserved for communication by the second UE;
means for measuring a system load of a sidelink channel associated with the one or more sidelink resources based at least in part on a conflict between one or more sidelink transmissions in the one or more sidelink resources reserved for communication by the second UE and one or more other sidelink transmissions; and
means for transmitting a message comprising an indication of the conflict based at least in part on the system load satisfying a threshold system load of the sidelink channel from a set of threshold system loads, wherein the threshold system load is associated with a priority of a sidelink transmission of the one or more sidelink transmissions or the one or more other sidelink transmissions, and wherein the sidelink transmission is associated with a highest priority of the one or more sidelink transmissions or the one or more other sidelink transmissions.

20. The apparatus of claim 19, further comprising:
means for determining the threshold system load of the sidelink channel based at least in part on one or more priorities associated with the one or more sidelink transmissions.

21. The apparatus of claim 20, further comprising:
means for selecting the threshold system load from the set of threshold system loads based at least in part on the priority of the sidelink transmission that is associated with the highest priority.

22. The apparatus of claim 21, wherein the set of threshold system loads is configured or pre-configured for the first UE, and each of the set of threshold system loads corresponds to a respective priority of a set of priorities for sidelink communications.

23. The apparatus of claim 19, further comprising:
means for receiving, from the second UE, second sidelink control information that indicates one or more second sidelink resources reserved for communication by the second UE;
means for measuring a second system load of the sidelink channel associated with the one or more second sidelink resources based at least in part on a second conflict between one or more second sidelink transmissions in the one or more second sidelink resources reserved for communication by the second UE and one or more second other sidelink transmissions; and
means for refraining from transmitting a second message comprising an indication of the second conflict based at least in part on the second system load failing to satisfy a second threshold system load of the sidelink channel, the second threshold system load based at least in part on one or more priorities associated with the one or more second sidelink transmissions.

24. The apparatus of claim 19, wherein the means for measuring the system load of the sidelink channel comprise:
means for measuring a channel occupancy ratio associated with the sidelink channel, a channel busy ratio associated with the sidelink channel, or both.

25. The apparatus of claim 19, wherein the conflict between the one or more sidelink transmissions and the one or more other sidelink transmissions comprises a time overlap between the one or more sidelink resources and the one or more other sidelink transmissions, a frequency overlap between the one or more sidelink resources and the one or more other sidelink transmissions, or both.

26. The apparatus of claim 19, wherein the means for transmitting the message comprising the indication of the conflict comprise:
means for transmitting the message comprising the indication of the conflict after the conflict has occurred, wherein the indication of the conflict indicates retransmission of the sidelink transmission by the second UE.

27. The apparatus of claim 19, wherein the means for transmitting the message comprising the indication of the conflict comprise:

means for transmitting the message comprising the indication of the conflict prior to the conflict occurring, wherein the indication of the conflict indicates the second UE to refrain from transmitting the sidelink transmission.

28. A non-transitory computer-readable medium storing code for wireless communication at a first user equipment (UE), the code comprising instructions executable by at least one processor to:
- receive, from a second UE, sidelink control information that indicates one or more sidelink resources reserved for communication by the second UE;
- measure a system load of a sidelink channel associated with the one or more sidelink resources based at least in part on a conflict between one or more sidelink transmissions in the one or more sidelink resources reserved for communication by the second UE and one or more other sidelink transmissions; and
- transmit a message comprising an indication of the conflict based at least in part on the system load satisfying a threshold system load of the sidelink channel from a set of threshold system loads, wherein the threshold system load is associated with a priority of a sidelink transmission of the one or more sidelink transmissions or the one or more other sidelink transmissions, and wherein the sidelink transmission is associated with a highest priority of the one or more sidelink transmissions or the one or more other sidelink transmissions.

29. The non-transitory computer-readable medium of claim 28, wherein the instructions are further executable by the at least one processor to:
- determine the threshold system load of the sidelink channel based at least in part on one or more priorities associated with the one or more sidelink transmissions.

30. The non-transitory computer-readable medium of claim 29, wherein the instructions are further executable by the at least one processor to:
- select the threshold system load from the set of threshold system loads based at least in part on the priority of the sidelink transmission that is associated with the highest priority.

* * * * *